(12) United States Patent
Nishida

(10) Patent No.: US 7,729,013 B2
(45) Date of Patent: Jun. 1, 2010

(54) IMAGE PROCESSING APPARATUS, IMAGE PROCESSING METHOD, AND COMPUTER PROGRAM PRODUCT

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 855 days.

(21) Appl. No.: 11/526,169

(22) Filed: Sep. 21, 2006

(65) Prior Publication Data

US 2007/0064279 A1 Mar. 22, 2007

(30) Foreign Application Priority Data

Sep. 21, 2005 (JP) .............................. 2005-274610

(51) Int. Cl.
*G06K 15/00* (2006.01)
*H04N 1/46* (2006.01)
(52) U.S. Cl. .................. 358/2.1; 358/537; 358/540; 382/167
(58) Field of Classification Search ................ 358/1.11, 358/462, 538, 1.9, 2.1, 3.01, 530, 537, 540; 382/176, 177, 229, 162, 167, 274
See application file for complete search history.

(56) References Cited

U.S. PATENT DOCUMENTS

| | | | |
|---|---|---|---|
| 6,630,966 B1 * | 10/2003 | Tournier ..................... 348/569 |
| 7,164,431 B1 * | 1/2007 | Chu et al. ................... 345/636 |
| 7,257,253 B2 * | 8/2007 | Ozawa et al. ............... 382/176 |
| 7,362,470 B2 * | 4/2008 | Sawada ...................... 358/1.9 |
| 2004/0076337 A1 | 4/2004 | Nishida | |
| 2005/0047660 A1 * | 3/2005 | Tanaka ....................... 382/176 |
| 2005/0278624 A1 * | 12/2005 | Nishikawa et al. .......... 715/517 |

FOREIGN PATENT DOCUMENTS

| | | | |
|---|---|---|---|
| JP | 2001-216498 A | 8/2001 |
| JP | 3101105 U | 2/2004 |
| JP | 2004-252866 A | 9/2004 |
| JP | 2004-320701 A | 11/2004 |

* cited by examiner

*Primary Examiner*—James A Thompson
(74) *Attorney, Agent, or Firm*—Blakely, Sokoloff, Taylor & Zafman LLP

(57) ABSTRACT

An image processing apparatus includes a character-area extracting unit that extracts a character area in which characters are displayed from image data including characters, a character-color converting unit that converts the color of characters in the character area extracted by the character-area extracting unit to a predetermined prescribed character color, and a background-color converting unit that converts a background color of the background, which is an area other than the characters in the character area extracted by the character-area extracting unit to a predetermined prescribed background color.

19 Claims, 24 Drawing Sheets

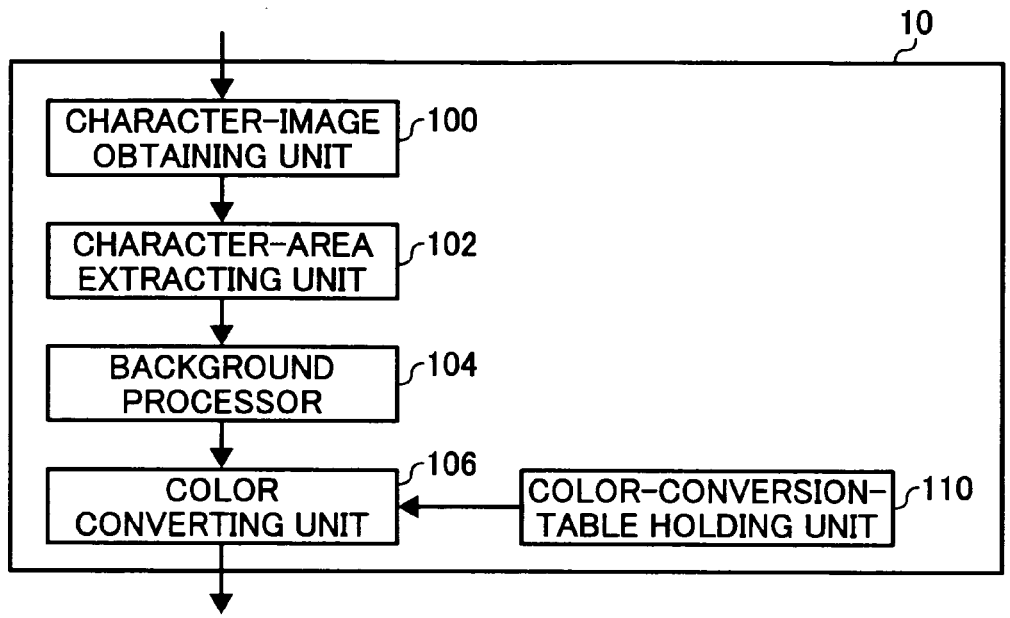

| COMBINATION | CHARACTER COLOR | BACKGROUND COLOR |
|---|---|---|
| 001 | WHITE | BLACK |
| 002 | WHITE | BLUE |
| 003 | YELLOW | BLACK |
| 004 | YELLOW | BLUE |
| ⋮ | ⋮ | ⋮ |

IMAGE PROCESSING APPARATUS, IMAGE PROCESSING METHOD, AND COMPUTER PROGRAM PRODUCT

PRIORITY

The present application claims priority to and incorporates by reference the entire contents of Japanese priority document, 2005-274610, filed in Japan on Sep. 21, 2005.

BACKGROUND OF THE INVENTION

1. Field of the Invention

The present invention relates to an image processing apparatus, an image processing method, and an image processing program that process image data including characters.

2. Description of the Related Art

Recently, with a trend of so-called "barrier-free" and "universal design", it has become important to create documents that can be easily understood by elderly persons, visually impaired persons, and persons having defective color perception. Particularly, the importance of improving the visibility of characters by designing an area of characters and an area other than characters, that is, by designing a combination of background colors, is recognized. Furthermore, designing of colors in drawings and graphs has also been considered as an important issue. For example, a method of printing clearer maps by correcting color designing and the thickness of characters is disclosed (for example, see Japanese Utility Model Registration No. 3101105). Thus, in document creation, it is expected to perform color designing from a barrier-free viewpoint.

Imaging devices in which various types of color correction with respect to a scanned image are incorporated have been known. These devices intend to improve contrast and tone in printing on paper and screen display, while maintaining the original hue (for example, see Japanese Patent Application Laid-open Nos. 2004-252866 and 2001-216498).

However, in the case of a document in which arrangement of colors in a created document itself or the configuration thereof is not appropriate, its readability cannot be improved even by improving contrast and tone. Particularly, there are many documents, which are not easy to read for visually impaired or handicapped persons, since these documents are not created from a barrier-free viewpoint.

SUMMARY OF THE INVENTION

An image processing apparatus, image processing method, and computer program product are described. In one embodiment, an image processing apparatus comprises a character-area extracting unit that extracts a character area from an image, a character-area specifying unit that specifies a character color of a character included in the extracted character area, a highlighted-character extracting unit that extracts a highlighted character from the character included in the extracted character area based on a specified character color, a highlight processor that changes a display mode of the extracted highlighted character, a character-color converting unit that converts a color of the extracted highlighted character and a color of characters other than the highlighted character to a first color, and a background-color converting unit that converts a background color of a background of the image to a second color different from the first color.

BRIEF DESCRIPTION OF THE DRAWINGS

FIG. 1 is a block diagram of a functional configuration of an image processing apparatus according to a first embodiment of the present invention;

FIGS. 2A, 2B, and 2C depict color conversion tables held by a color-conversion-table holding unit;

DETAILED DESCRIPTION OF THE PREFERRED EMBODIMENTS

Figure 3:
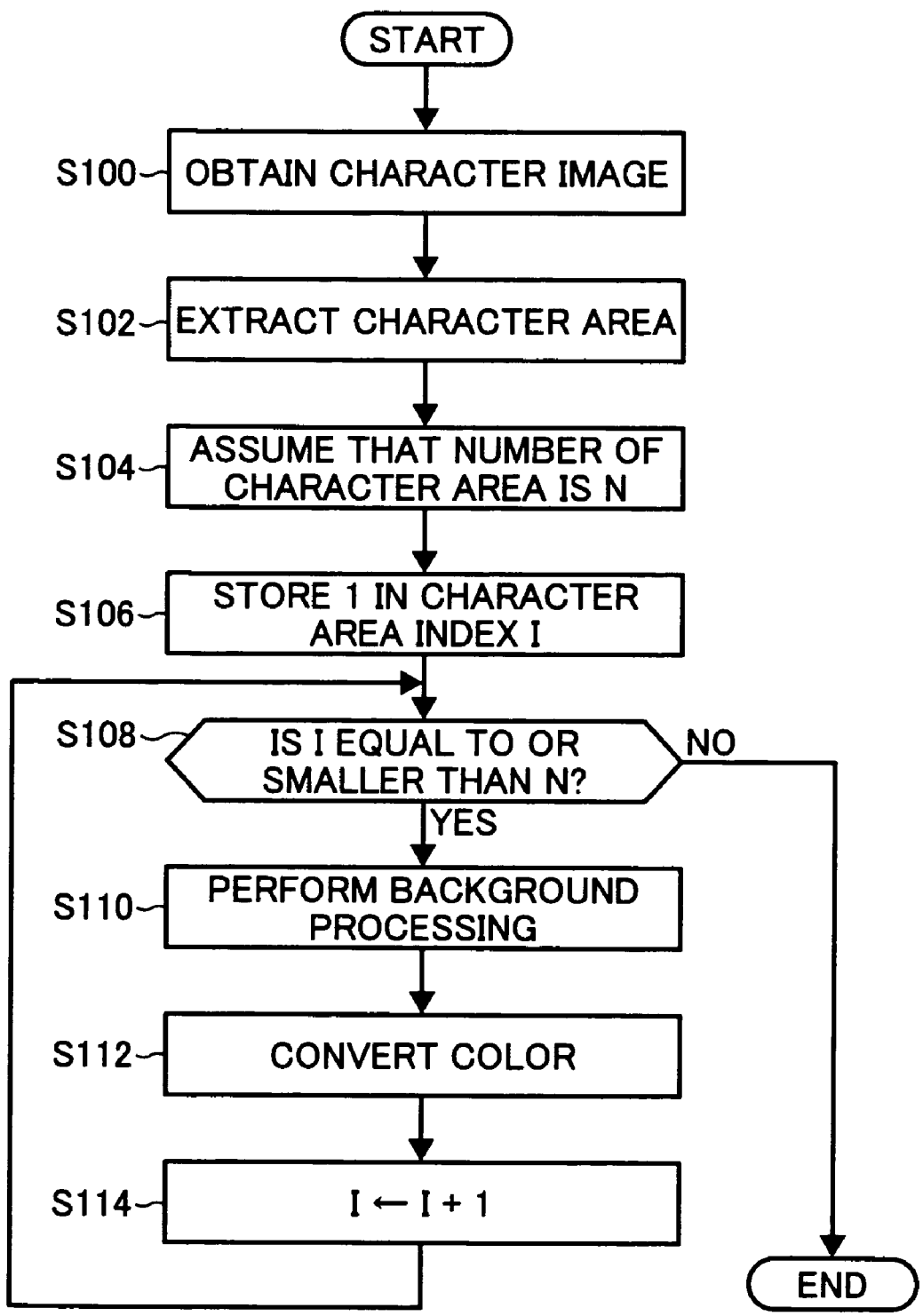
FIG. 3 is a flowchart of image processing performed by the image processing apparatus.

Embodiments of the present invention at least partially solve the problems in the conventional technology.

According to one embodiment of the present invention, an image processing apparatus includes a character-area extracting unit that extracts a character area from an image; a character-area specifying unit that specifies a character color of a character included in extracted character area; a highlighted-character extracting unit that extracts a highlighted character from the character included in the extracted character area based on a specified character color; a highlight processor that changes a display mode of the extracted highlighted character; a character-color converting unit that converts a color of the extracted highlighted character and a color of characters other than the highlighted character to a first color; and a background-color converting unit that converts a background color of a background of the image to a second color different from the first color.

According to another embodiment of the present invention, an image processing method includes extracting a character area from an image; specifying a character color of a character included in the extracted character area; extracting a highlighted character from the character included in the extracted character area based on a specified character color; changing a display mode of the extracted highlighted character; converting a color of the extracted highlighted character and a color of characters other than the highlighted character to a first color; and converting a background color of a background of the image to a second color different from the first color.

According to still another embodiment of the present invention, a computer-readable recording medium stores therein a computer program that causes a computer to execute the above image processing method.

The above and other embodiments, features, advantages and technical and industrial significance of this invention will be better understood by reading the following detailed description of presently preferred embodiments of the invention, when considered in connection with the accompanying drawings.

Exemplary embodiments of the present invention will be explained in detail below with reference to the accompanying drawings.

FIG. 1 is a block diagram of a functional configuration of an image processing apparatus 10 according to a first embodiment of the present invention. The image processing apparatus 10 includes a character-image obtaining unit 100, a character-area extracting unit 102, a background processor 104, a color-conversion-table holding unit 110, and a color converting unit 106.

The character-image obtaining unit 100 obtains a character image to be processed from an external location. The character image represents an image in which a character is displayed. The character image includes an image of other than the character, for example, a photograph.

The character-area extracting unit 102 extracts a character area, in which the character is displayed, from the character image obtained by the character-image obtaining unit 100. Specifically, the character-area extracting unit 102 classifies the character image into characters, tables, diagrams, and others. The character-area extracting unit 102 generates a line by integrating the characters, and generates an area by integrating the lines. In one embodiment, generating the line and the area are performed according to the technique described in Japanese Patent Application Laid-Open No. 2000-67158. A technique described in Japanese Patent Application Laid-Open No. 2000-11310 can be used as well.

The background processor 104 performs background processing with respect to the character area extracted by the character-area extracting unit 102. Specifically, the background processor 104 specifies a background part first. The background part represents a part in which items other than characters are displayed. The background processor 104 then specifies a color of the background part, that is, specifies a background color. The background processor 104 corrects the tone of the background part based on the prescribed background color. In one embodiment, the tone is corrected using the technique described in Japanese Patent Application Laid-Open No. 2004-320701.

The color-conversion-table holding unit 110 holds a color conversion table for converting a color of the character area having been subjected to the background processing by the background processor 104 to another color. The color conversion table is, for example, a correspondence table for converting the color of the character part to yellow, and the color of the background part to blue. In this case, yellow is a predetermined prescribed character color, and blue is a predetermined prescribed background color. The color-conversion-table holding unit 110 according to the first embodiment corresponds to a converted color holding unit in the appended claims.

FIGS. 2A, 2B, and 2C depict the color conversion tables held by the color-conversion-table holding unit 110. The values on an upper row shown in FIGS. 2A, 2B, and 2C indicate respective values of Red-Green-Blue (RGB) of an image before conversion. Values on a lower row indicate respective values of RGB after conversion. Thus, respective colors before the conversion are converted to the predetermined prescribed colors based on the color conversion table. For example, when image colors to be converted are R255, G255, and B255, the image colors are converted to R0, G0, and B255.

As a creation method of this table, for example, the prescribed character color is specified as yellow, and the prescribed background color is specified as blue. Based on the prescribed colors, the color conversion table is created. Specifically, character colors are designated as RGB three colors, which are expressed as FG[3]. The background color is also designated as RGB three colors, which are expressed as GB[3]. Since there are 256 tone levels, the color conversion table is designated as TAB[3][256]. At this time, with regard to the J-th component (J=0, 1, 2) corresponding to RGB, when FG[J] is not BG[J], that is, when the values of the background color and the character color are different, the color conversion table is created according to following Equation 1. On the other hand, when FG[J]=BG[J], a color conversion table is created for each color.

$$TAB[J][K] = K*(BG[J]-FG[J])/255 + FG[J] \quad (1)$$

The color converting unit 106 uses the color conversion table held by the color-conversion-table holding unit 110, to perform color conversion of the character area having been subjected to the background processing by the background processor 104.

FIG. 3 is a flowchart of image processing performed by the image processing apparatus 10. At first, the character-image obtaining unit 100 in the image processing apparatus 10 obtains a character image to be processed from outside (step S100). The character-area extracting unit 102 extracts the character area from the character image obtained by the character-image obtaining unit 100 (step S102). The number of the character area extracted by the character-area extracting unit 102 is designated as N (step S104), and 1 is stored in a character area index I (step S106).

When I is equal to or less than N (step S108, Yes), the background processor 104 selects an optional character area from N character areas extracted by the character-area extracting unit 102, and applies the background processing to the character area (step S110). The color converting unit 106 performs color conversion with respect to the character image after the background processing, using the color conversion table held by the color-conversion-table holding unit 110 (step S112).

"I+1" is substituted in the character area index I (step S114). Returning to step S108, to repeat steps S110 to S114 until I becomes I=N (step S108).

When I=N+1 (step S108, No), that is, when the color conversion is applied to all character areas extracted by the character-area extracting unit 102, the image processing by the image processing apparatus 10 is complete.

Figure 4:
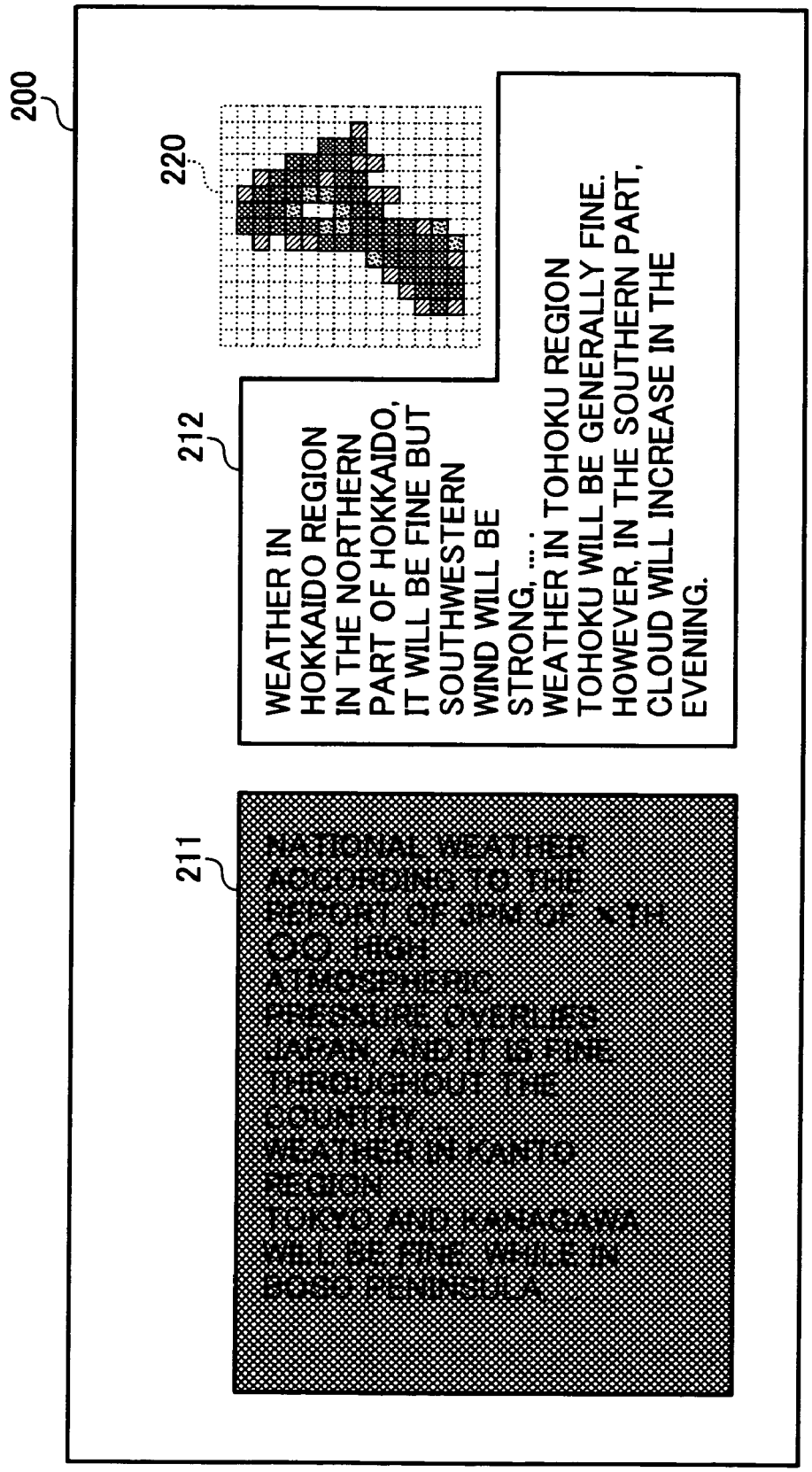
FIG. 4 is an example of a character image obtained by a character-image obtaining unit.

FIG. 4 is an example of the character image obtained by the character-image obtaining unit 100. In character image 200 shown in FIG. 4, a photograph is displayed in addition to characters. In the character image 200 shown in FIG. 4, character areas 211 and 212 are extracted. The area not extracted is an image area 220.

Figure 5:
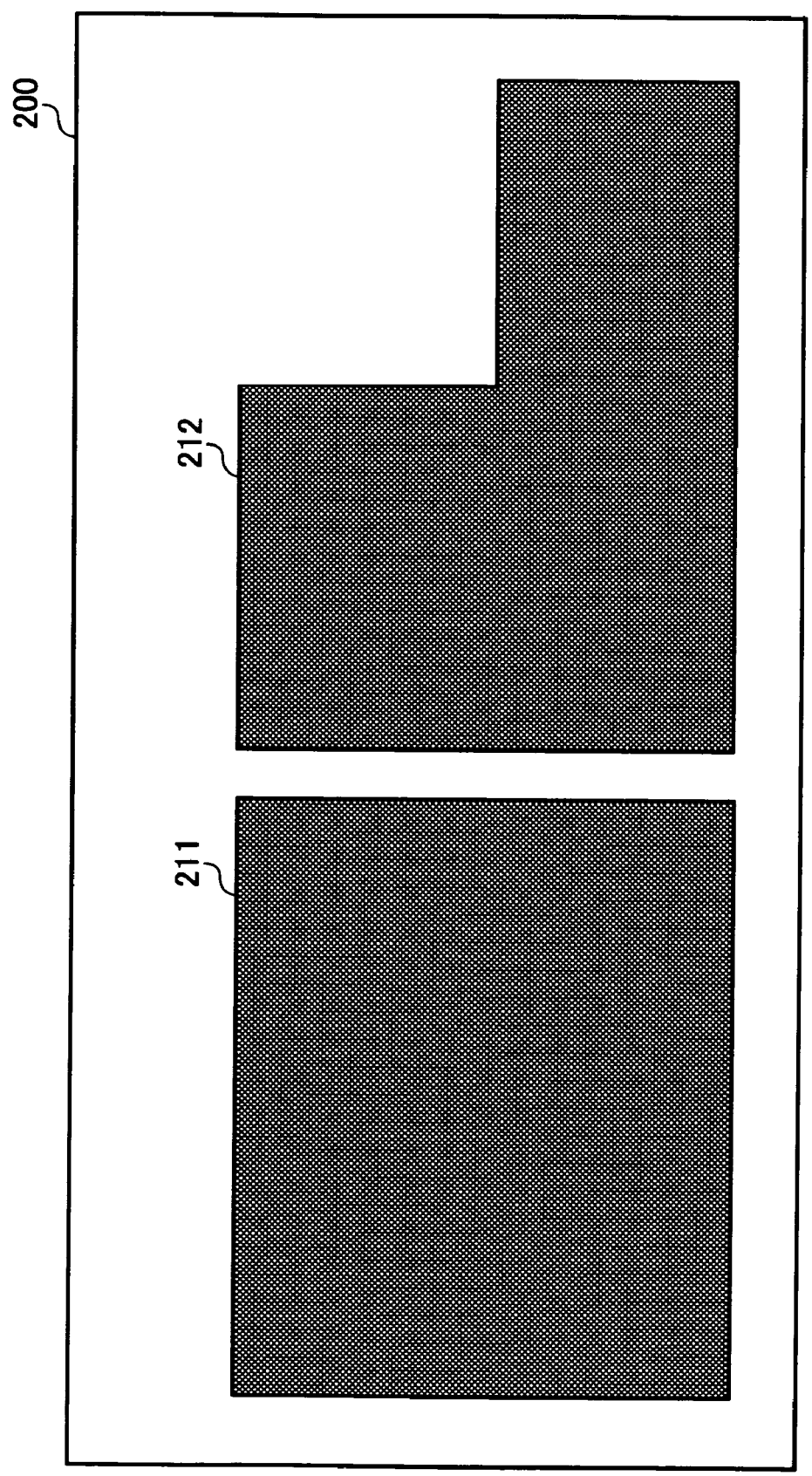
FIG. 5 depicts a situation where a character-area extracting unit extracts character areas in the character image shown in FIG. 4.

FIG. 5 depicts a situation where the character-area extracting unit 102 extracts the character areas 211 and 212 in the character image 200 shown in FIG. 4. Thus, the character-area extracting unit 102 can extract only the character areas 211 and 212 from the image including the character areas 211 and 212 and the image area 220.

Figure 6:
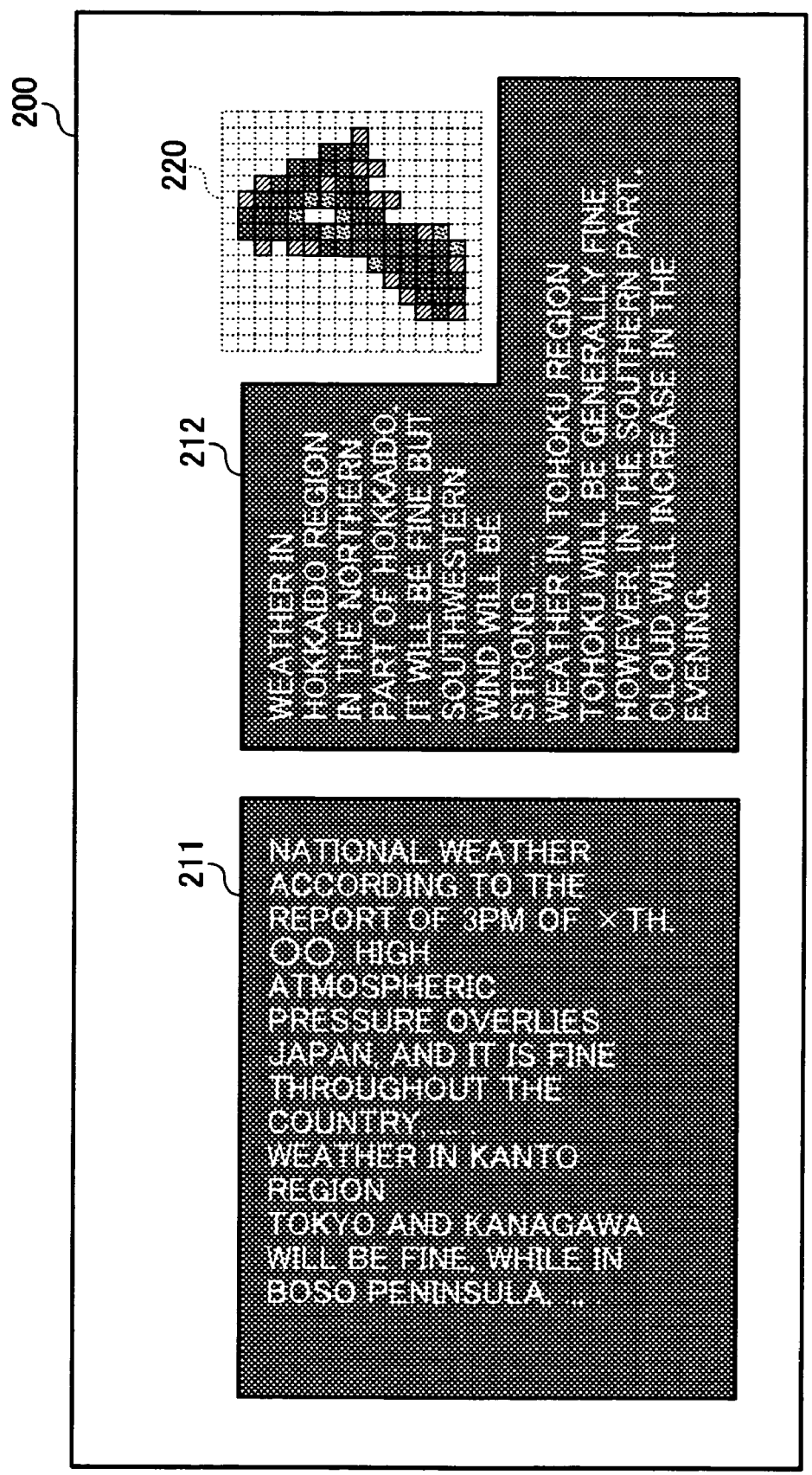
FIG. 6 depicts the character image after color conversion is applied to the character areas shown in FIG. 5.

FIG. 6 depicts the character image 200 after color conversion is applied to the character areas 211 and 212 shown in FIG. 5. Thus, the image processing apparatus 10 according to the first embodiment applies color conversion only to the character areas 211 and 212, and leaves the image area 220 in an original color.

Figure 7:
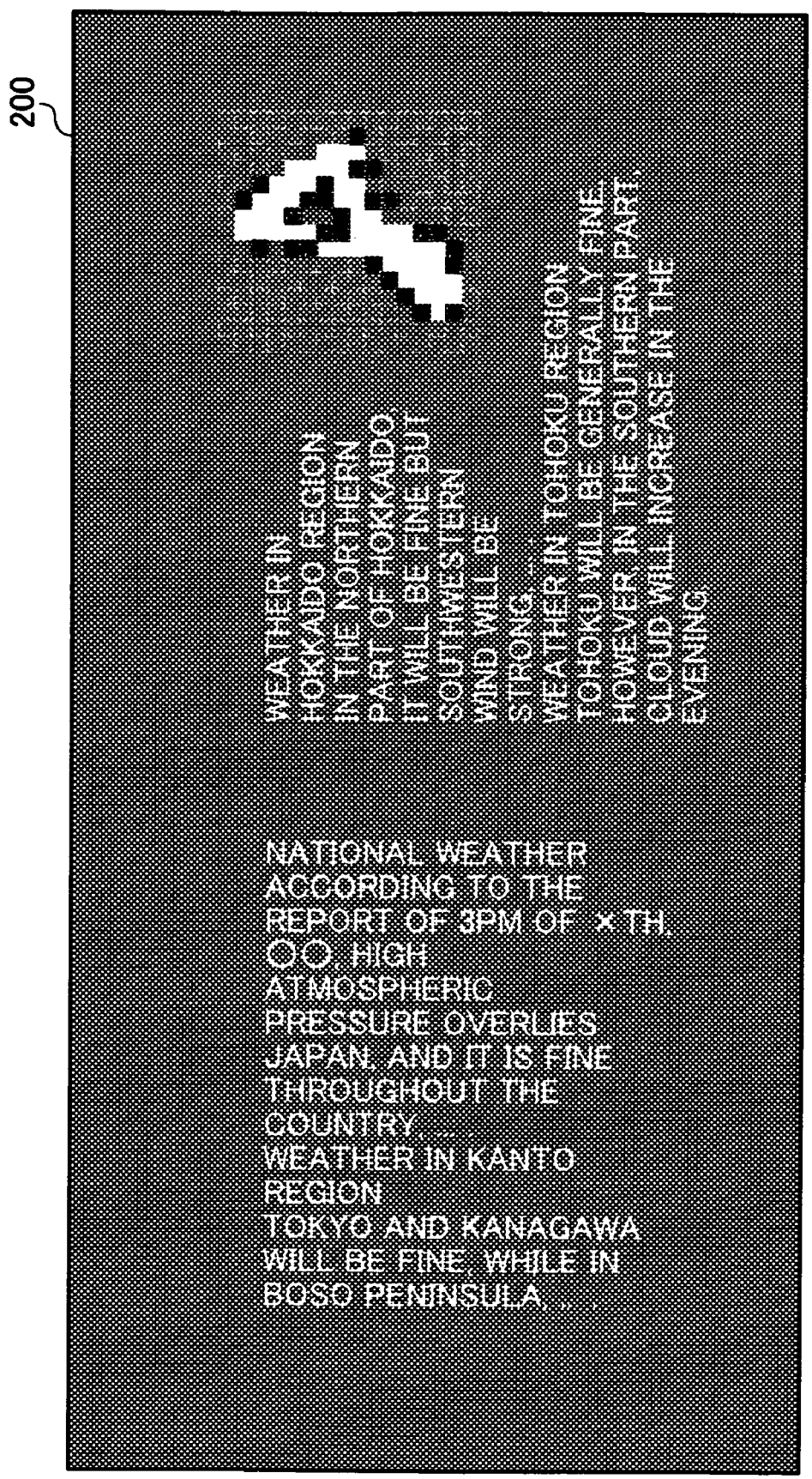
FIG. 7 depicts the character image after color conversion is applied to all areas in the character image using the color conversion table held by the color-conversion-table holding unit.

FIG. 7 depicts the character image 200 after color conversion is applied to all areas in the character image 200 using the color conversion table held by the color-conversion-table holding unit 10. When color conversion using the color conversion table is applied to the image area 220, even a highlighted part in the image area 220 is also color-converted to the same hue as that of the background color. That is, improper color conversion can be performed.

On the other hand, the image processing apparatus 10 according to the first embodiment performs color conversion using the color conversion table held by the color-conversion-table holding unit 110. However, since an object of color conversion is limited only to the character area, the photograph image is held in the original color, while converting the character area to a clearer color, thereby avoiding unnecessary color conversion of the photograph image to be performed by color conversion.

Figure 8:
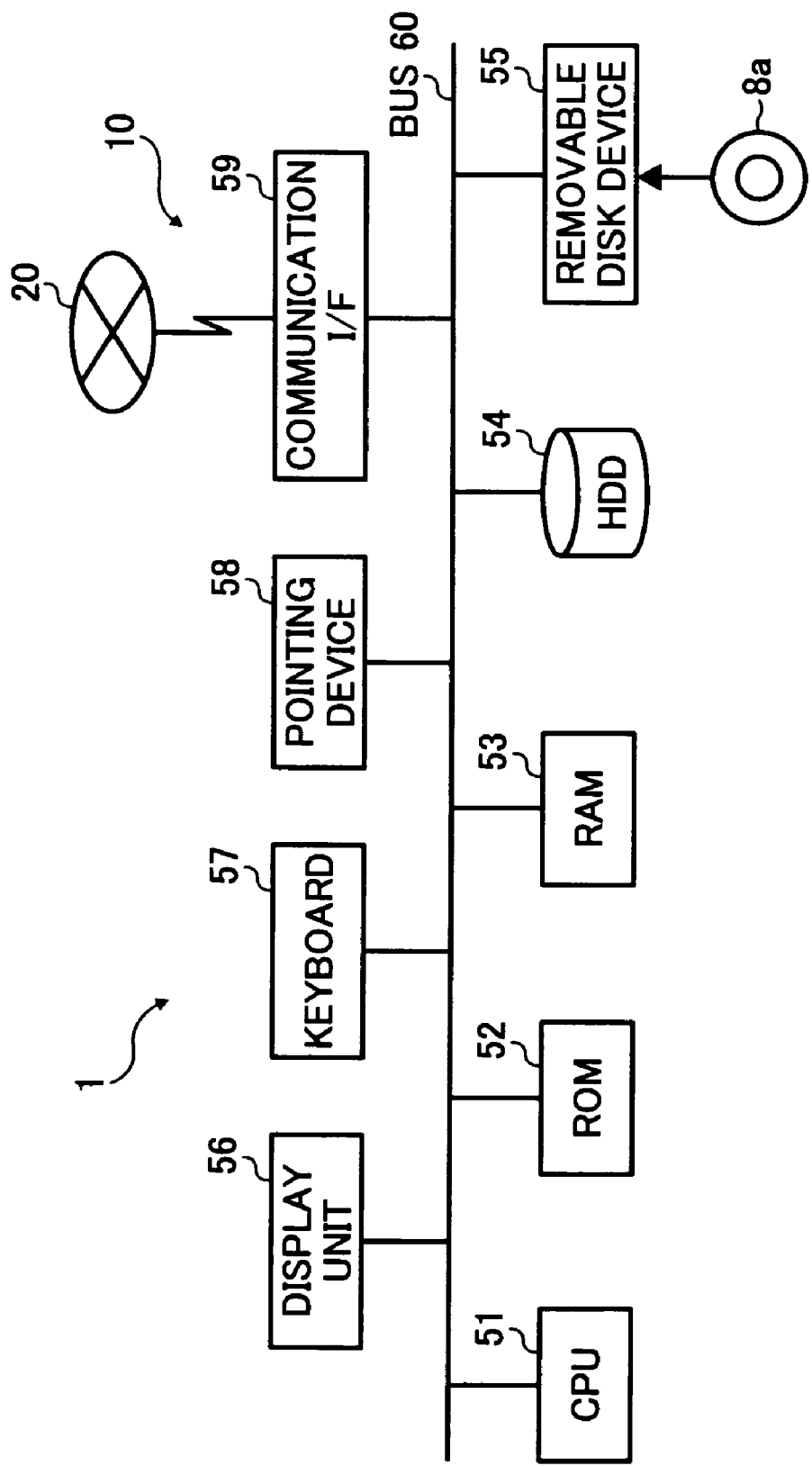
FIG. 8 depicts a hardware configuration of the image processing apparatus according to the first embodiment.

FIG. 8 depicts a hardware configuration of the image processing apparatus 10 according to the first embodiment. The image processing apparatus 10 includes a read only memory (ROM) 52 that stores an image processing program for executing the image processing in the image processing apparatus 10 and the like, a central processing unit (CPU) 51 that controls respective units of the image processing apparatus 10 according to the program in the ROM 52, a random access memory (RAM) 53 that stores various data necessary for controlling the image processing apparatus 10, a communication interface (I/F) 59 that performs communication by connecting to a network 20, and a bus 60 that connects respective units with each other, as the hardware configuration.

The image processing apparatus 10 also includes a secondary storage apparatus such as a hard disk drive (HDD) 54, which is a storage unit that stores therein data files (for example, color bit map image data), a removable disk device 55 such as a CD-ROM drive for storing information, distributing the information to the outside, and obtaining information from the outside, a display unit 56 such as a cathode ray tube (CRT) or a liquid crystal display (LCD) that displays the development of processing, results, and the like to an operator, a keyboard 57 for inputting a command, information, and the like to the CPU 51 by the operator, and a pointing device 58 such as a mouse or the like.

The image processing program in the image processing apparatus 10 can be recorded on a computer readable recording medium, such as a CD-ROM, a floppy$^{(R)}$ disk (FD), or a digital versatile disk (DVD) in a file of an installable format or executable format, and can be provided.

In this case, the image processing program is loaded on a main memory in the image processing apparatus 10 by reading the program from the recording medium and executing the program, so that the respective units explained in the software configuration are generated on the main memory.

The image processing program according to the first embodiment is stored in the computer connected to the network such as the Internet, and downloaded via the network.

While the image processing apparatus 10 according to the first embodiment is a general personal computer, it is not limited thereto. The image processing apparatus 10 can be a portable information terminal referred to as a personal digital assistant (PDA), palmTopPC, a mobile phone, a personal handyphone system (PHS), and the like.

In the image processing apparatus 10, when the user turns the power on, the CPU 51 activates a program referred to as a loader in the ROM 52, reads a program referred to as an operating system for managing the hardware and software in the computer from the HDD 54 to the RAM 53, in order to activate the operating system.

The operating system activates a program, reads information, and stores the information, in response to a user's operation. Windows (registered trademark), UNIX (registered trademark), and the like are well known as a representative operating system. An operation program that is executed on the operating system is referred to as an application program.

Thus, the image processing apparatus 10 can store the image processing program as the application program in the HDD 54. In this sense, the HDD 544 functions as a recording medium for storing the image processing program.

In the image processing apparatus 10, when the image processing program operating on the operating system is activated, the CPU 51 executes various types of arithmetic processing according to the image processing program, to control the respective units in a concentrated manner.

When a real-time system needs to be emphasized, it is necessary to perform high-speed processing. For this purpose, it is desired to provide a logic circuit (not shown) separately, to execute various types of arithmetic processing by the operation of the logic circuit.

While the first embodiment has been explained according to the first embodiment, various modifications and alternations can be added to the first embodiment.

In the first embodiment, the background processing is performed after the character area has been extracted, however, as a first example of a modification of the first embodiment, either extraction of the character area or the background processing can be performed first.

While the image processing apparatus 10 according to the first embodiment includes the background processor 104, as a second example of a modification, the image processing apparatus 10 does not necessarily include the background processor 104. In this case, the color converting unit 106 can directly apply a color conversion to the character area extracted by the character-area extracting unit 102.

Figure 9:
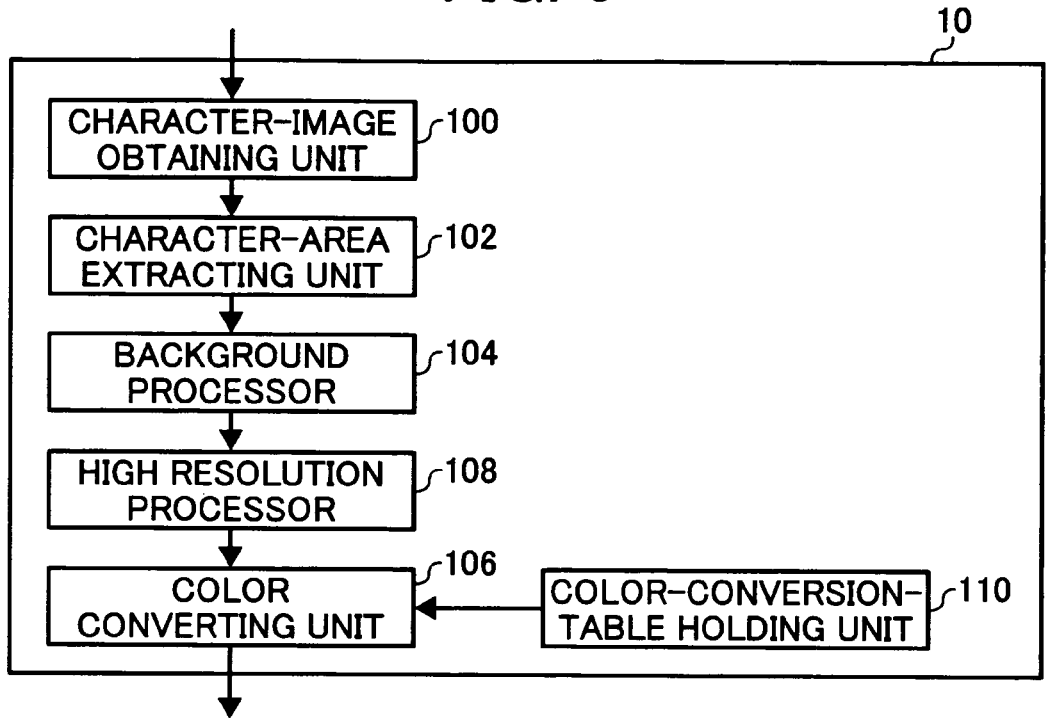
FIG. 9 is a block diagram of a functional configuration of an image processing apparatus according to a third modification of the first embodiment.

FIG. 9 is a block diagram of a functional configuration of the image processing apparatus 10 according to a third example of a modification to the first embodiment. The image processing apparatus 10 according to the third example modification includes a high resolution processor 112 in addition to the functional configuration of the image processing apparatus 10 according to the first embodiment. The high resolution processor 112 applies high resolution processing to the character image having been subjected to the background processing performed by the background processor 104.

Specifically, the high resolution processor 112 generates a luminance curve of the character part. The high resolution processor 112 reproduces a minute portion as a part of a character in the luminance curve. In one embodiment, this is performed using a technique described in Japanese Patent Application Laid-Open No. 2005-63055. Thus, by applying high resolution processing to respective characters, the character image 200 can be made clearer.

Figure 10:
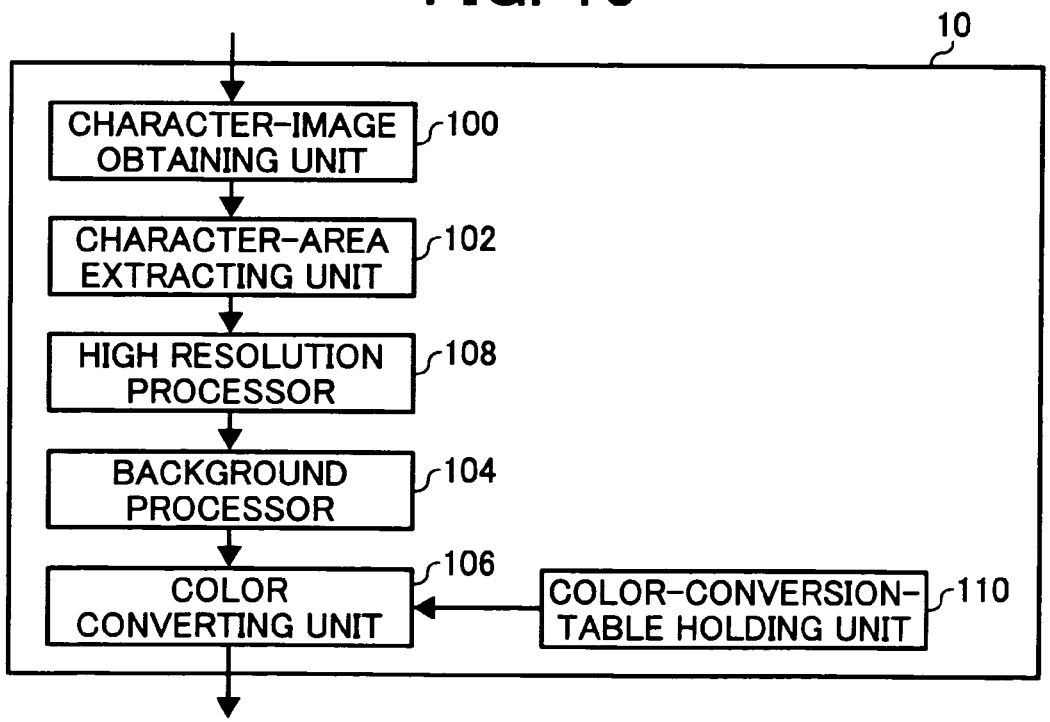
FIG. 10 is a block diagram of a functional configuration of an image processing apparatus according to a fourth modification of the first embodiment.

FIG. 10 is a block diagram of a functional configuration of the image processing apparatus 10 according to a fourth example of a modification to the first embodiment. The image processing apparatus 10 according to the fourth example modification includes the high resolution processor 112 as in the image processing apparatus 10 according to the third example modification. However, the high resolution processor 112 according to the fourth example modification performs high resolution processing prior to the background processing.

In the third and the fourth examples of modification, the high resolution processing is performed after the character area has been extracted; however, either extraction of the character area or the high resolution processing can be performed first.

As a fifth example of a modification to the first embodiment, the color converting unit 106 in the first embodiment converts the character color and the background color in the character area using the color conversion table held by the color-conversion-table holding unit 110; however, the color converting unit 106 can convert these colors to colors desired by the user. In this case, a prescribed character color designation receiving unit (not shown) receives a character color specified by the user. Further, a prescribed background color designation receiving unit (not shown) receives a background color specified by the user. The color-conversion-table holding unit 110 converts the character color and the background color to those specified by the user.

As a sixth example of a modification to the first embodiment, the same color conversion table is used for color conversion of the character color and the background color in the first embodiment; however, a color conversion table used for color conversion of the character color and a color conversion table used for color conversion of the background can be respectively held.

Figure 11:
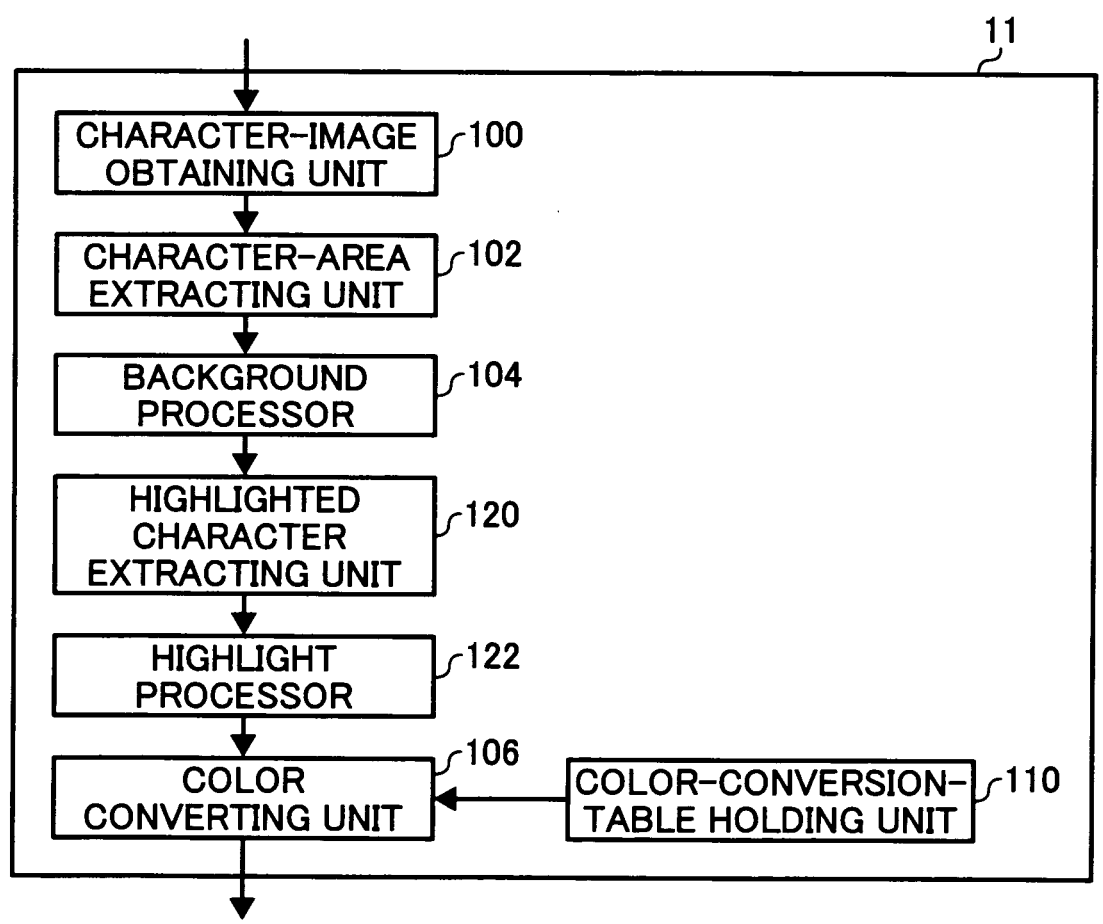
FIG. 11 is a block diagram of a functional configuration of an image processing apparatus according to a second embodiment of the present invention.

FIG. 11 is a block diagram of a functional configuration of an image processing apparatus 11 according to a second embodiment of the present invention. The image processing apparatus 11 includes a highlighted-character extracting unit 120 and a highlight processor 122 in addition to the functional configuration of the image processing apparatus 10 according to the first embodiment.

The highlighted-character extracting unit 120 extracts highlighted characters based on the character color, which is a color of respective characters included in the character area extracted by the character-area extracting unit 102. The highlight processor 122 changes a display mode of the highlighted characters so that the highlighted characters extracted by the highlighted-character extracting unit 120 can be recognized as highlighted characters. The color converting unit 106 performs color conversion with respect to the character part after having been subjected to highlight processing.

Figure 12:
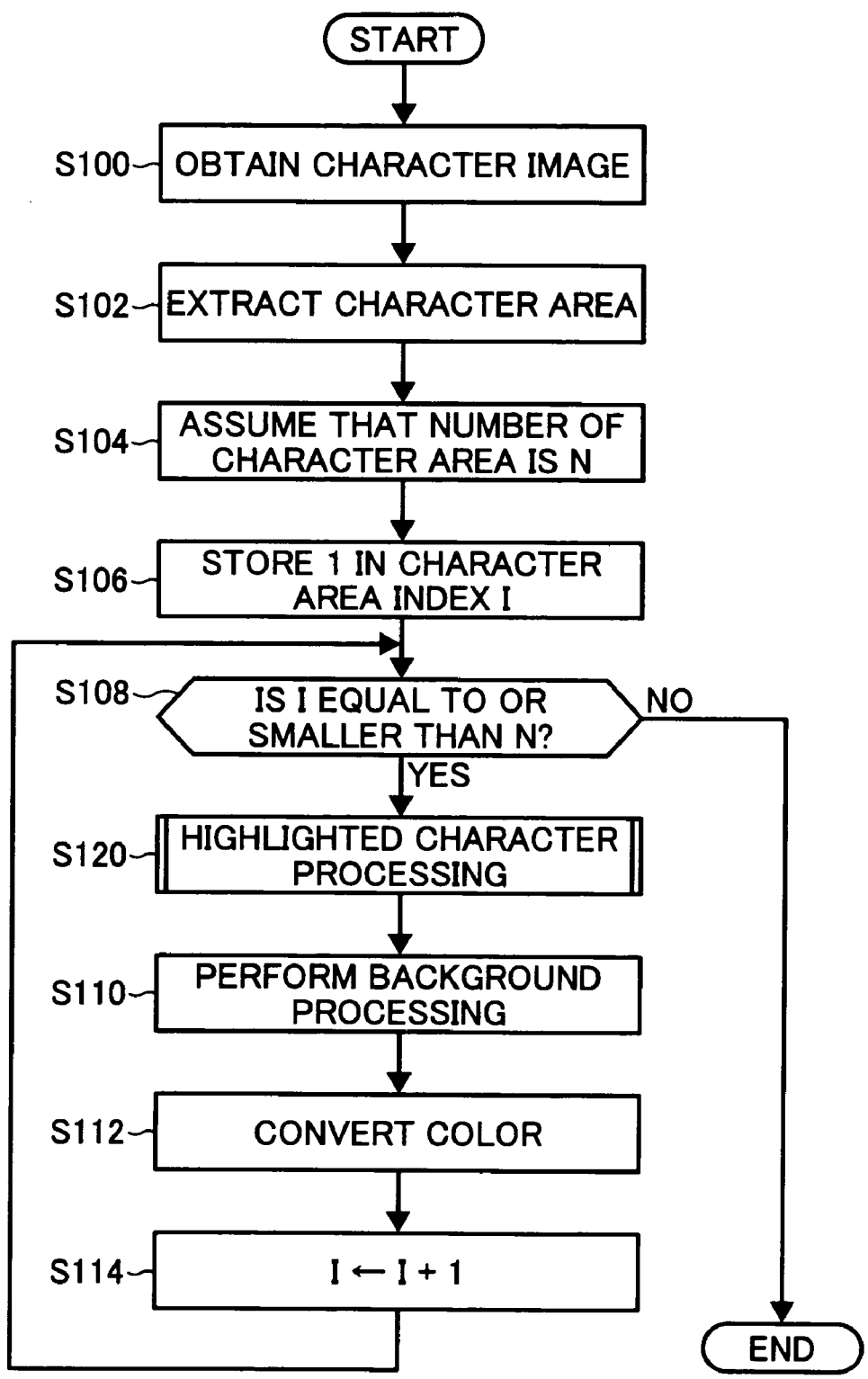
FIG. 12 is a flowchart of image processing performed by the image processing apparatus according to the second embodiment.

FIG. 12 is a flowchart of the image processing performed by the image processing apparatus 11. When the character area index I is equal to or less than N (step S108, Yes), the highlighted character processing is performed (step S120), and subsequently, the background processing is performed (step S110).

Figure 13:
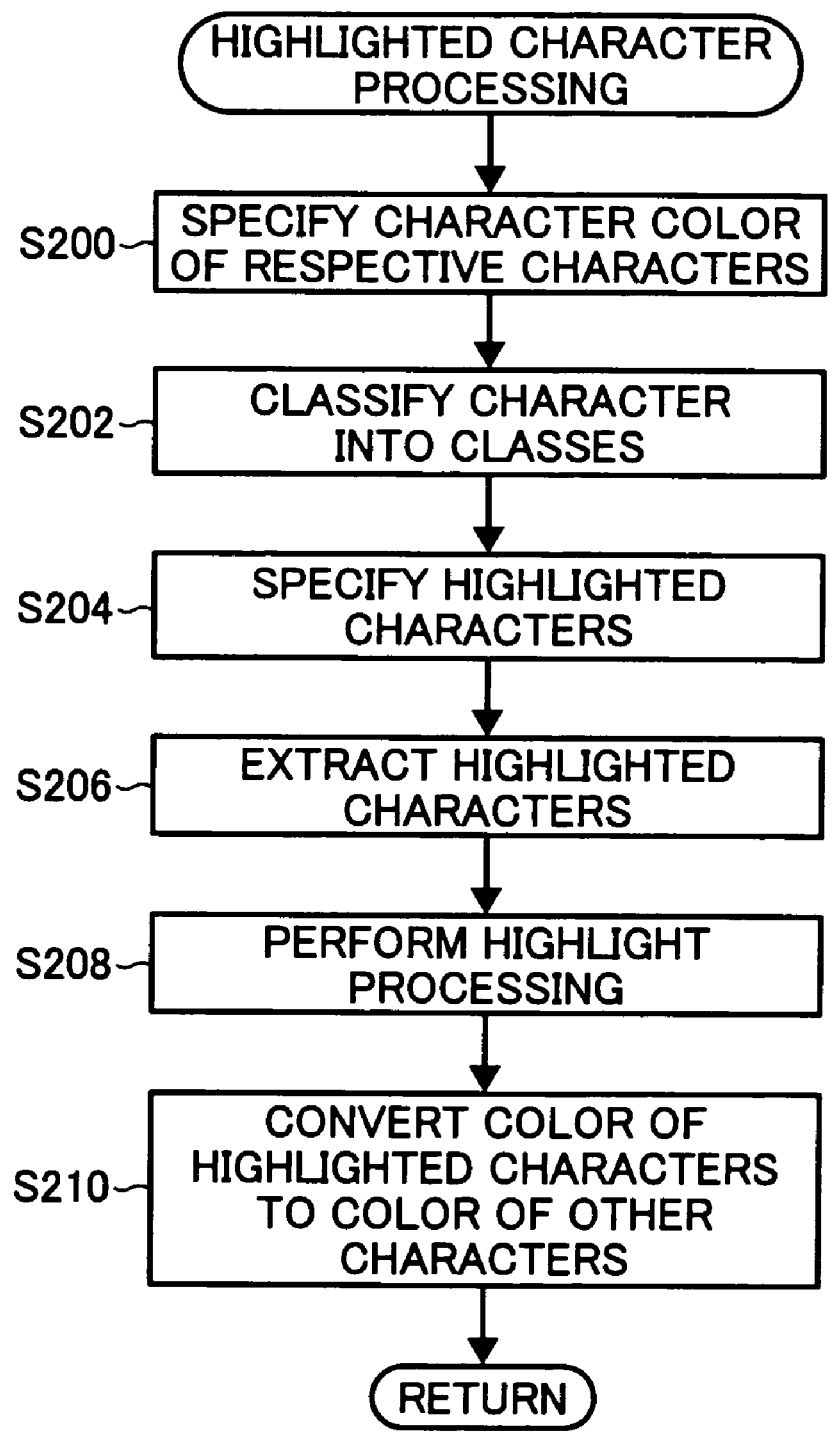
FIG. 13 is a flowchart of detailed processes in highlighted character processing (step S120) shown in FIG. 12.

FIG. 13 is a flowchart of detailed processes in the highlighted character processing (step S120) shown in FIG. 12. In the highlighted character processing (step S120), the highlighted-character extracting unit 120 specifies the character color of each character included in the character area extracted by the character-area extracting unit 102 (step S200). The highlighted-character extracting unit 120 then classifies the characters into classes for each character color (step S202). The highlighted-character extracting unit 120 specifies a character belonging to a class having less number of characters as a highlighted character, of the characters classified into the classes (step S204). The highlighted-character extracting unit 120 then extracts the character specified as the highlighted character (step S206).

The highlight processing is applied to the extracted characters (step S208). Subsequently, the color of the highlighted characters having been subjected to the highlight processing is converted to a color of another character included in the same character area (step S210). Thus, by making the color of the highlighted characters the same as that of other characters, all characters can be converted to almost the same color by color conversion using the color conversion table at step S206.

Figure 14:
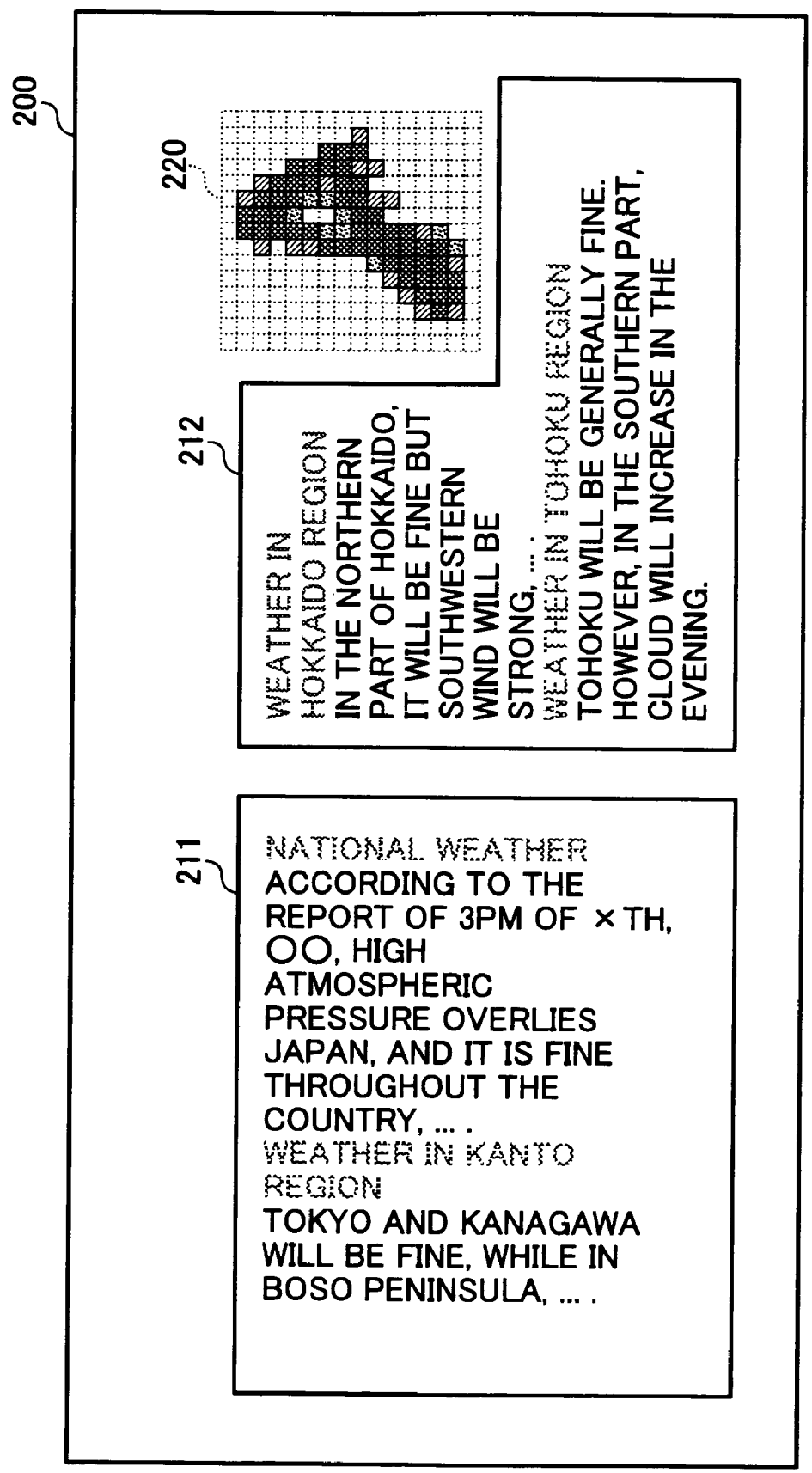
FIG. 14 depicts a character image including highlighted characters.

FIG. 14 depicts the character image 200 including highlighted characters. In the character image 200 shown in FIG. 14, major part of the characters in the character areas 211 and 212 are displayed in black. However, the characters of "National weather" and "Weather in Kanto region" in the character area 211 are displayed in gray. The characters of "Weather in Hokkaido region" and "Weather in Tohoku region" are also displayed in gray. Thus, the characters displayed in a color different from that of other characters are the highlighted characters.

When characters other than black are converted according to the color conversion table held by the color-conversion-table holding unit 110, there is a possibility that these characters are converted to a color that isn't preferred from a viewpoint of clearness, although these can be displayed in a color different from that of other characters. Therefore, in the second embodiment, highlight processing is performed.

Figure 15:
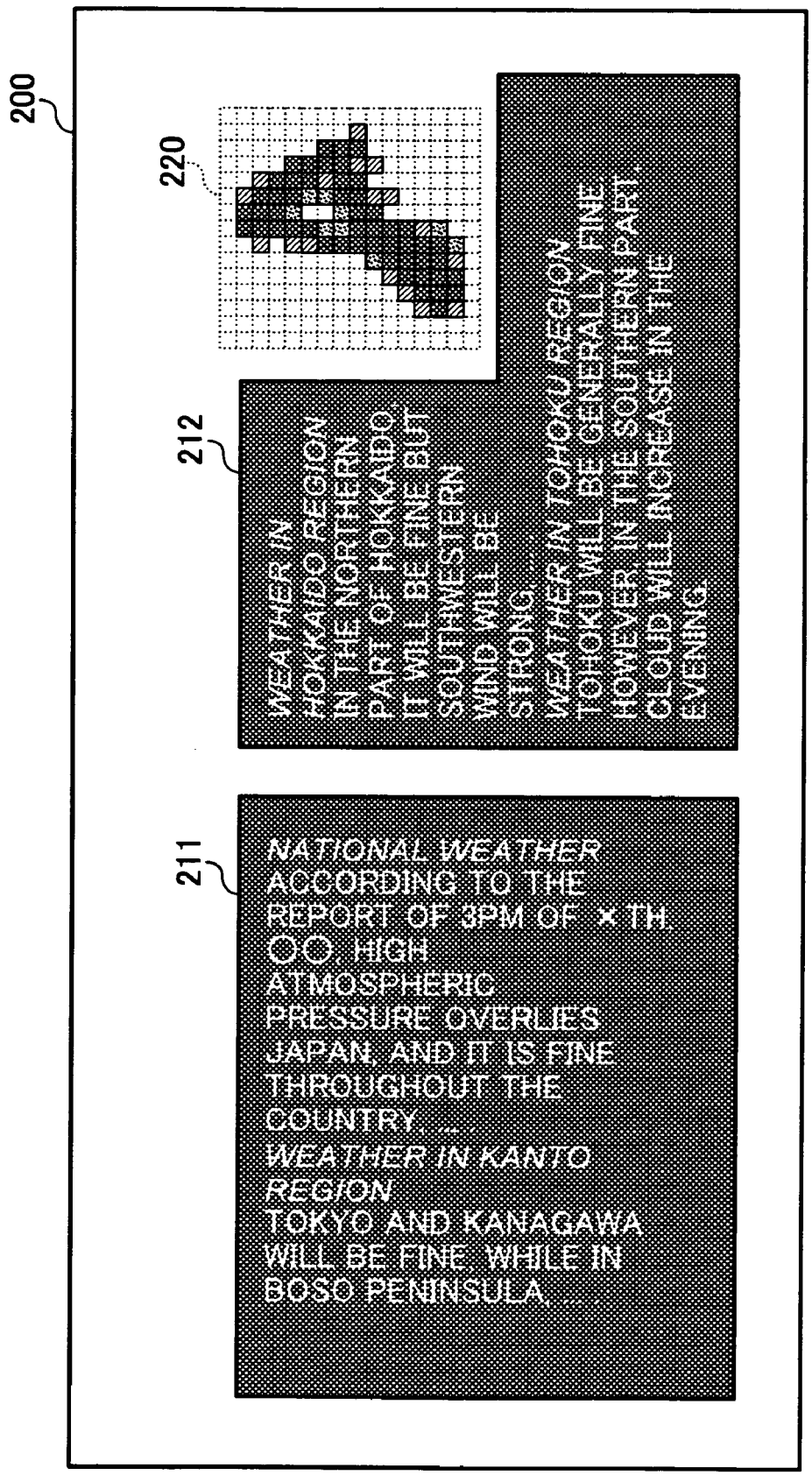
FIG. 15 depicts a result of performing highlight processing with respect to the character image shown in FIG. 14.

FIG. 15 depicts a result of performing the highlight processing with respect to the character image 200 shown in FIG. 14. As shown in FIG. 15, the highlighted characters are changed from a standard format to italic display. That is, in the highlighted characters shown in FIG. 15, the style of type is changed to the italic type as the highlight processing.

The style of type can be changed to a bold-faced type as the highlight processing. As another example, the style of type can be another style.

Figure 16:
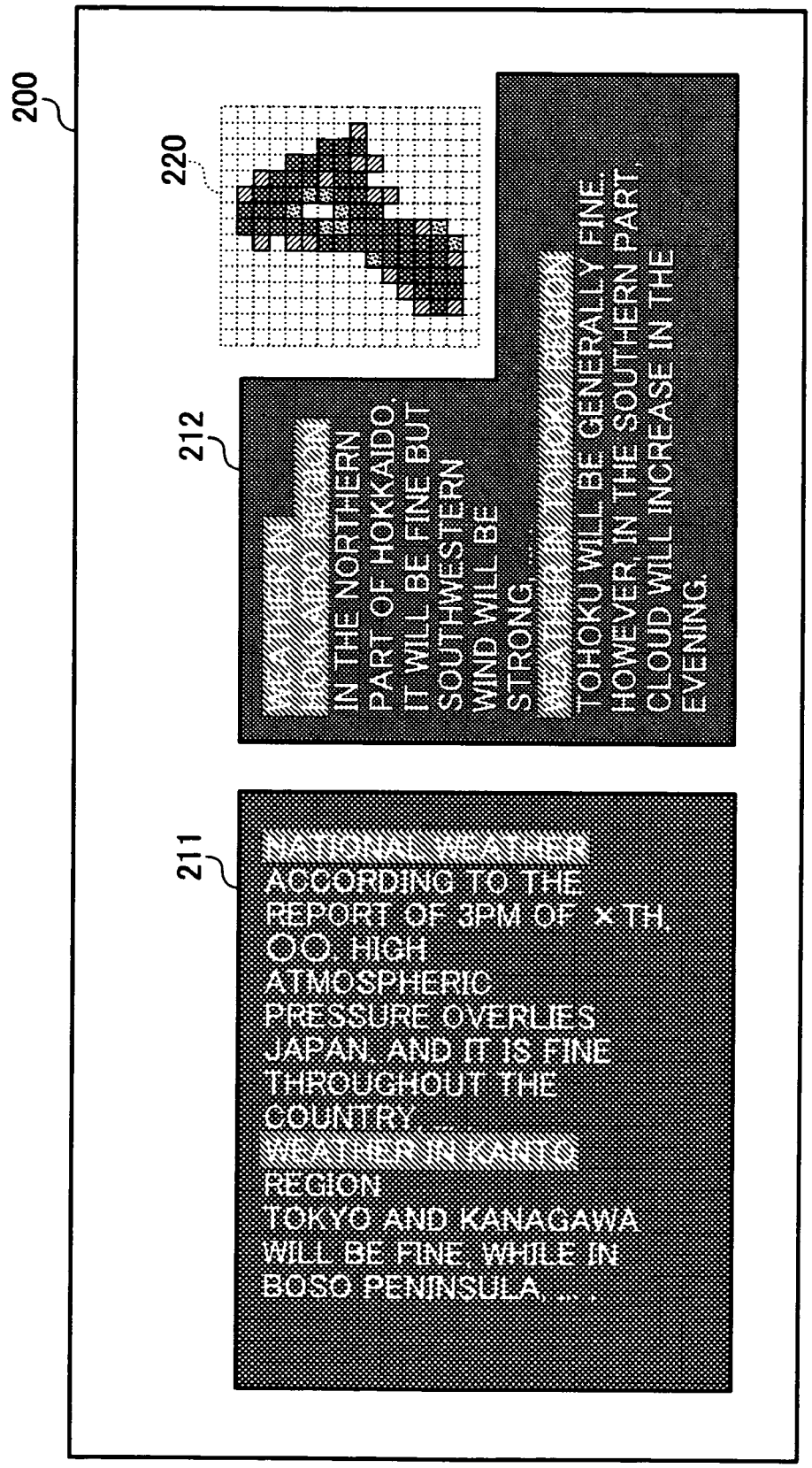
FIG. 16 depicts highlighted characters indicated by shading as the highlight processing.

FIG. 16 depicts highlighted characters indicated by shading as the highlight processing. The boundary regions of the highlighted characters shown in FIG. 16 are indicated by shading. Thus, the display mode of the highlighted characters can be made different from other characters by applying shading.

The configuration and processing of the image processing apparatus 11 other than those described above are the same as the configuration and processing of the image processing apparatus 10 according to the first embodiment.

Figure 17:
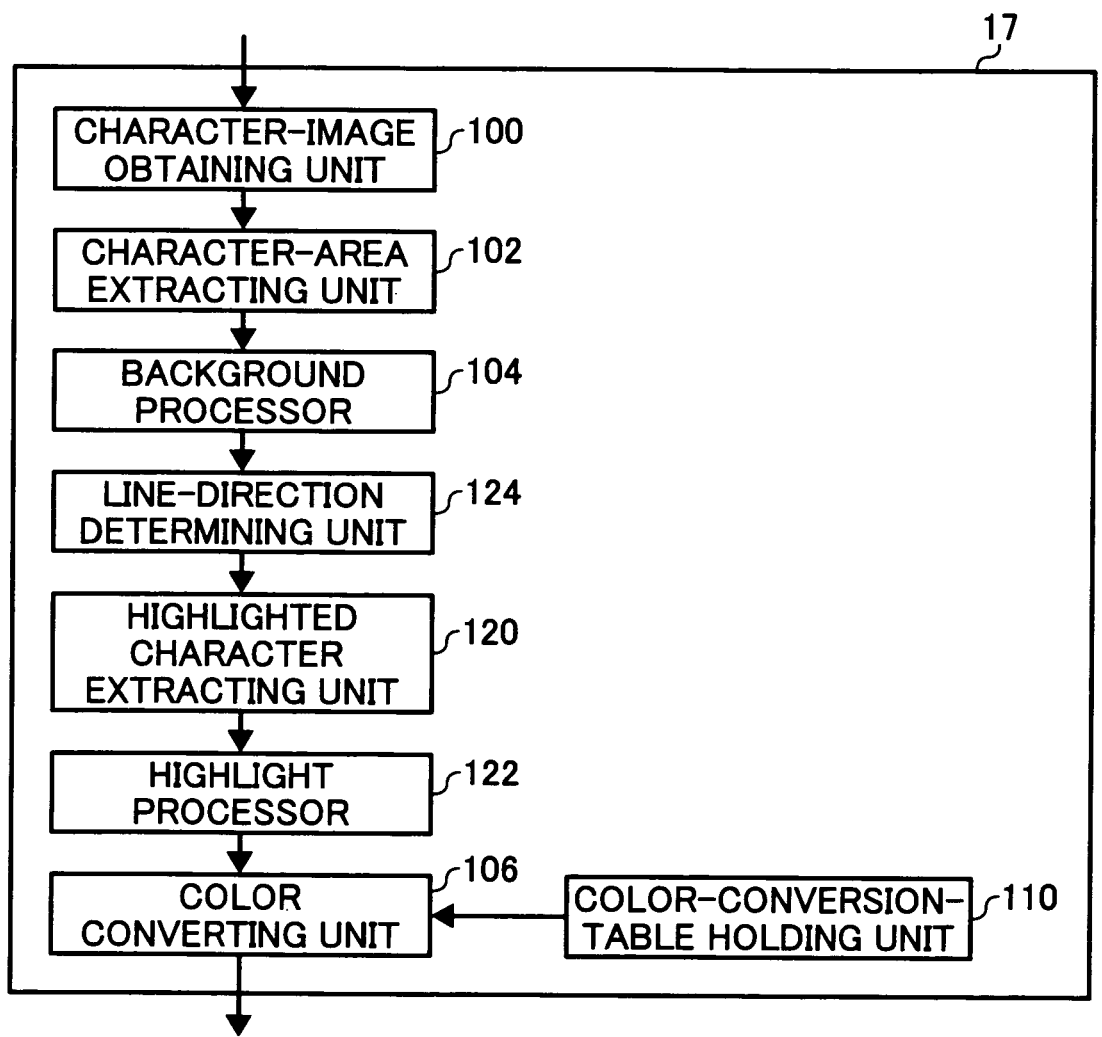
FIG. 17 is a block diagram of a functional configuration of an image processing apparatus according to a third embodiment of the present invention.

FIG. 17 is a block diagram of a functional configuration of an image processing apparatus 17 according to a third embodiment of the present invention. The image processing apparatus 17 includes a line-direction determining unit 124 in addition to the functional configuration of the image processing apparatus 11 according to the second embodiment.

The line-direction determining unit 124 determines a direction of character lines included in the character area extracted by the character-area extracting unit 102. That is, the line-direction determining unit 124 determines whether the document is written in vertical writing or horizontal writing. The highlight processor 122 adds a highlight mark at a position determined according to the line direction determined by the line-direction determining unit 124.

Specifically, in the case of vertical writing, the highlight processor 122 adds a line as a highlight mark on the right or left of the characters to change the display mode from others. In the case of horizontal writing, the highlight processor 122 adds a line below the characters to change the display mode from others. The added line is not particularly limited, and it can be a straight line, a wavy line, a broken line, or a double line.

As another example, in the case of vertical writing, the highlight processor 122 can add dots as a highlight mark on the right or left of the characters to change the display mode from others. In the case of horizontal writing, the highlight processor 122 can add dots above or below the characters.

Figure 18:
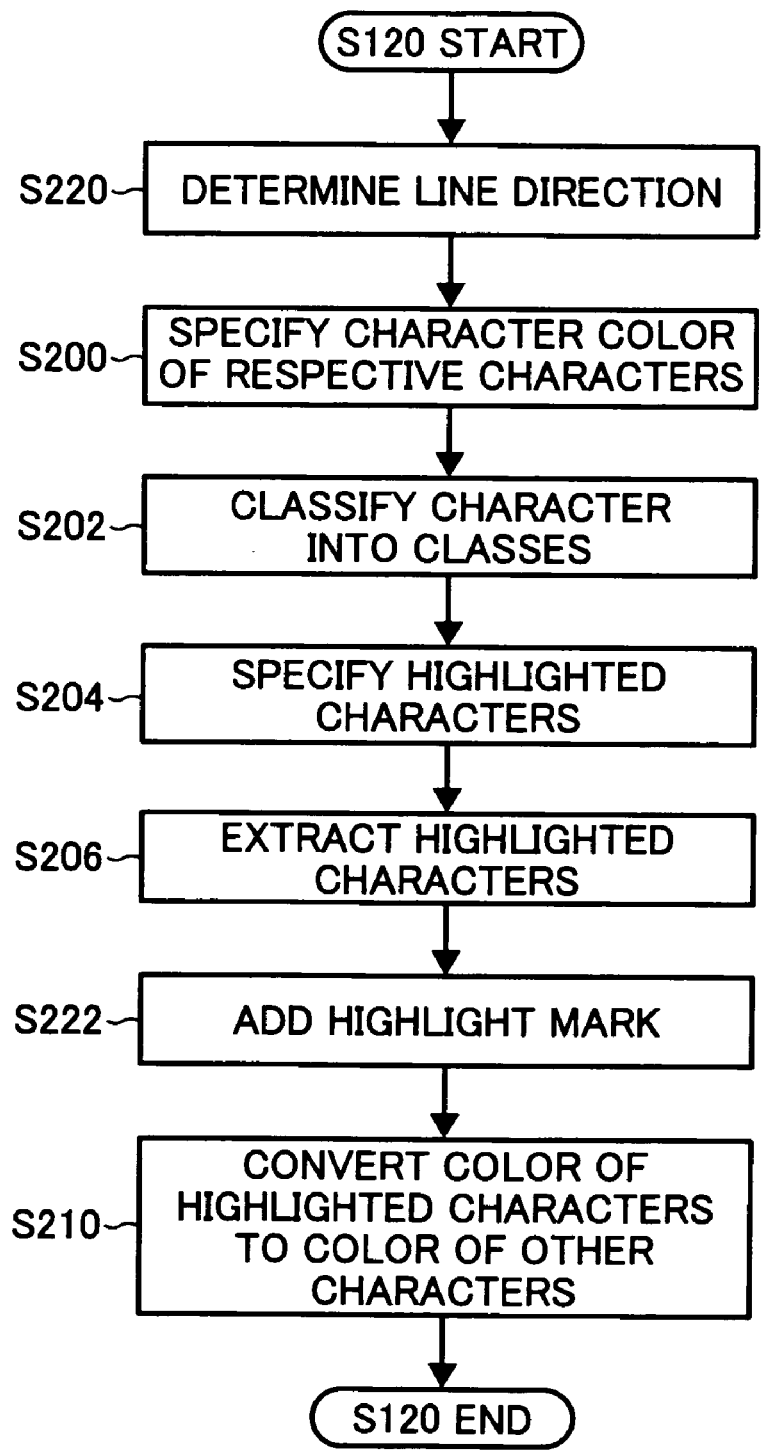
FIG. 18 is a flowchart of detailed processes in highlighted character processing (step S120) by the image processing apparatus according to the third embodiment.

FIG. 18 is a flowchart of detailed processes in the highlighted character processing (step S120) by the image processing apparatus 17. In the highlighted character processing (step S120), the line-direction determining unit 124 determines the line direction (step S220). Thereafter, colors of respective characters are specified (step S200).

When highlighted characters are extracted (step S206), the highlight processor 122 adds a highlight mark (step S222). The highlighted character processing (step S120) is then complete.

Figure 19:
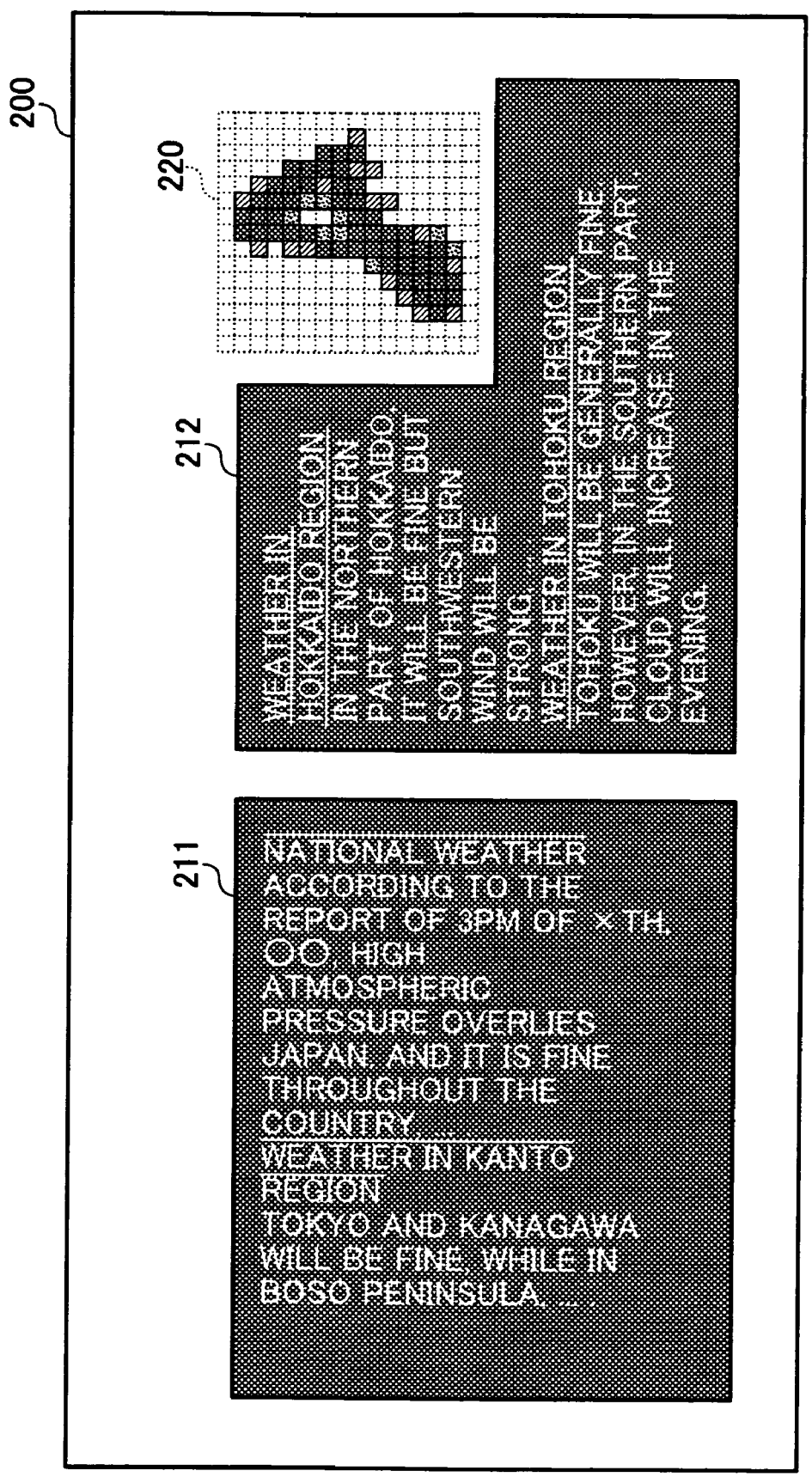
FIG. 19 is an example in which a straight line is added as a highlight mark.

FIG. 19 is an example in which a straight line is added as the highlight mark. When it is determined that the document is written in vertical writing by line determination, a straight line is added on the right of the highlighted characters. When it is determined that the document is written in horizontal writing by line determination, a straight line is added below the highlighted characters.

Since a straight line is added, a reader can easily recognize that the corresponding characters are highlighted characters.

Figure 20:
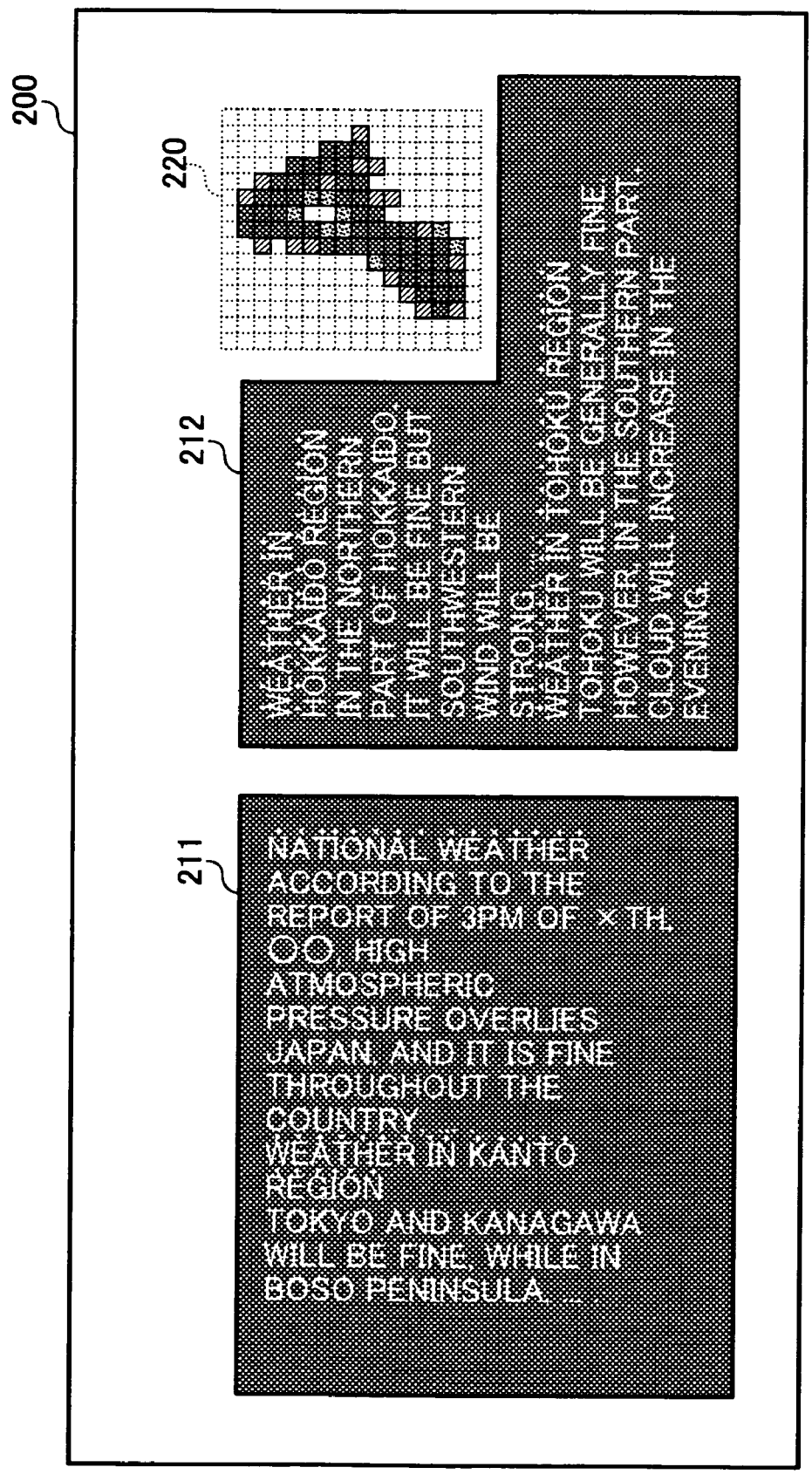
FIG. 20 is an example in which dots are added as a highlight mark.

FIG. 20 is an example in which dots are added as the highlight mark. When it is determined that the document is written in vertical writing by line determination, dots are added on the right of the highlighted characters. When it is determined that the document is written in horizontal writing by line determination, the dots are added above the highlighted characters. Also in this case, since dots are added, the reader can easily recognize that the corresponding characters are the highlighted characters.

Other configurations and processing of the image processing apparatus 17 are the same as those of the image processing apparatus 11 according to the second embodiment.

Figure 21:
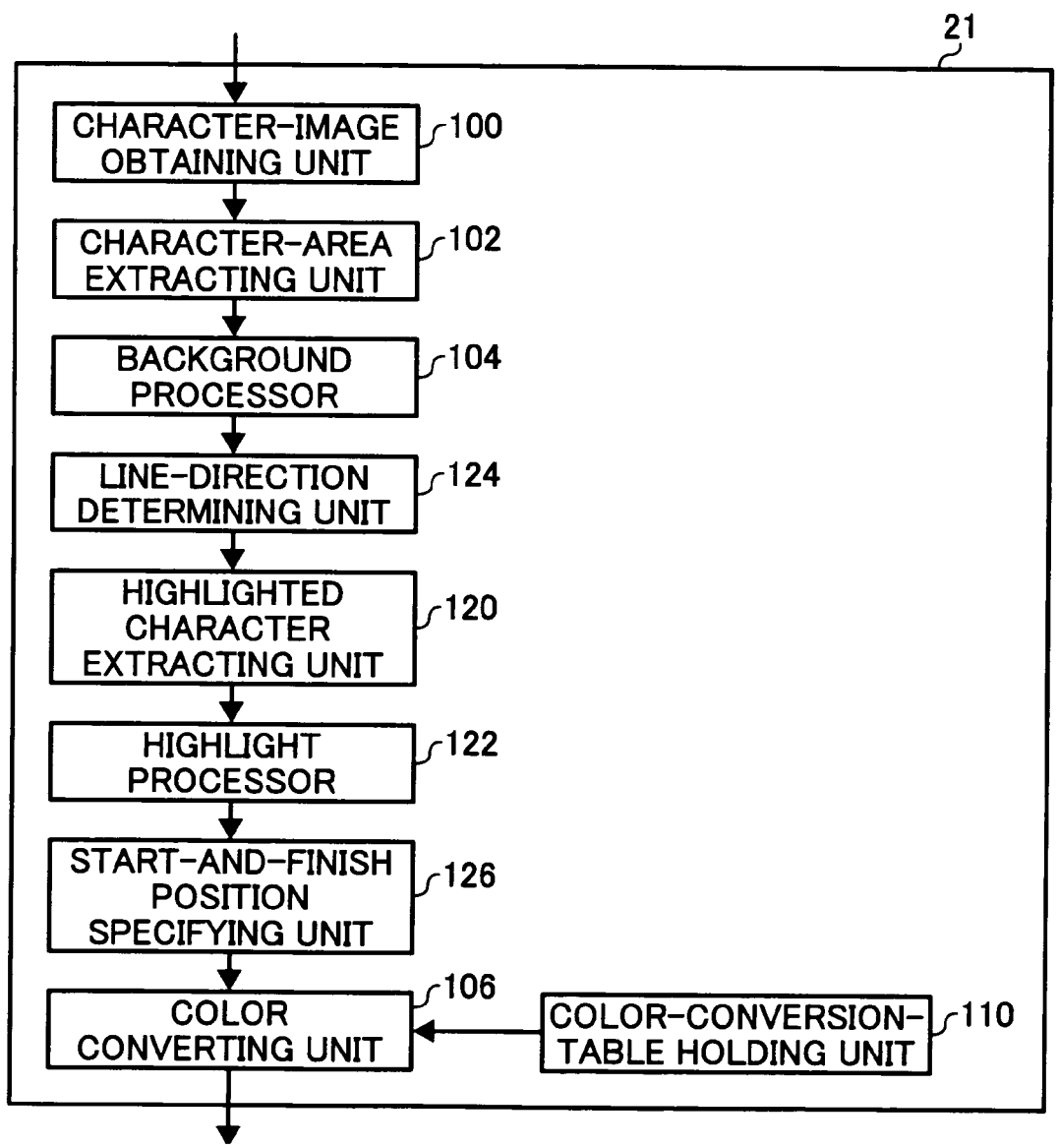
FIG. 21 is a block diagram of a functional configuration of an image processing apparatus according to a fourth embodiment of the present invention.

FIG. 21 is a block diagram of a functional configuration of the image processing apparatus 21 according to a fourth embodiment of the present invention. The image processing apparatus 21 includes a start-and-finish position specifying unit 126 in addition to the functional configuration of the image processing apparatus 17 according to the third embodiment.

The start-and-finish position specifying unit 126 specifies a start position and a finish position of highlighted characters specified by the highlighted-character extracting unit 120. Specifically, the start-and-finish position specifying unit 126 searches highlighted characters along the line direction specified by the line-direction determining unit 124, and specifies a position immediately before the highlighted character detected first as the start position. The start-and-finish position specifying unit 126 also specifies a position immediately behind the highlighted character detected last as the finish position.

The highlight processor 122 according to the fourth embodiment adds a highlight mark indicating that it is a start position and a highlight mark indicating that it is a finish position of the highlighted characters with respect to the respective start position and finish position specified by the start-and-finish position specifying unit 126. Specifically, for example, the highlight processor 122 displays a pair of brackets at the start position and the finish position. The form of the brackets is not particularly limited.

Figure 22:
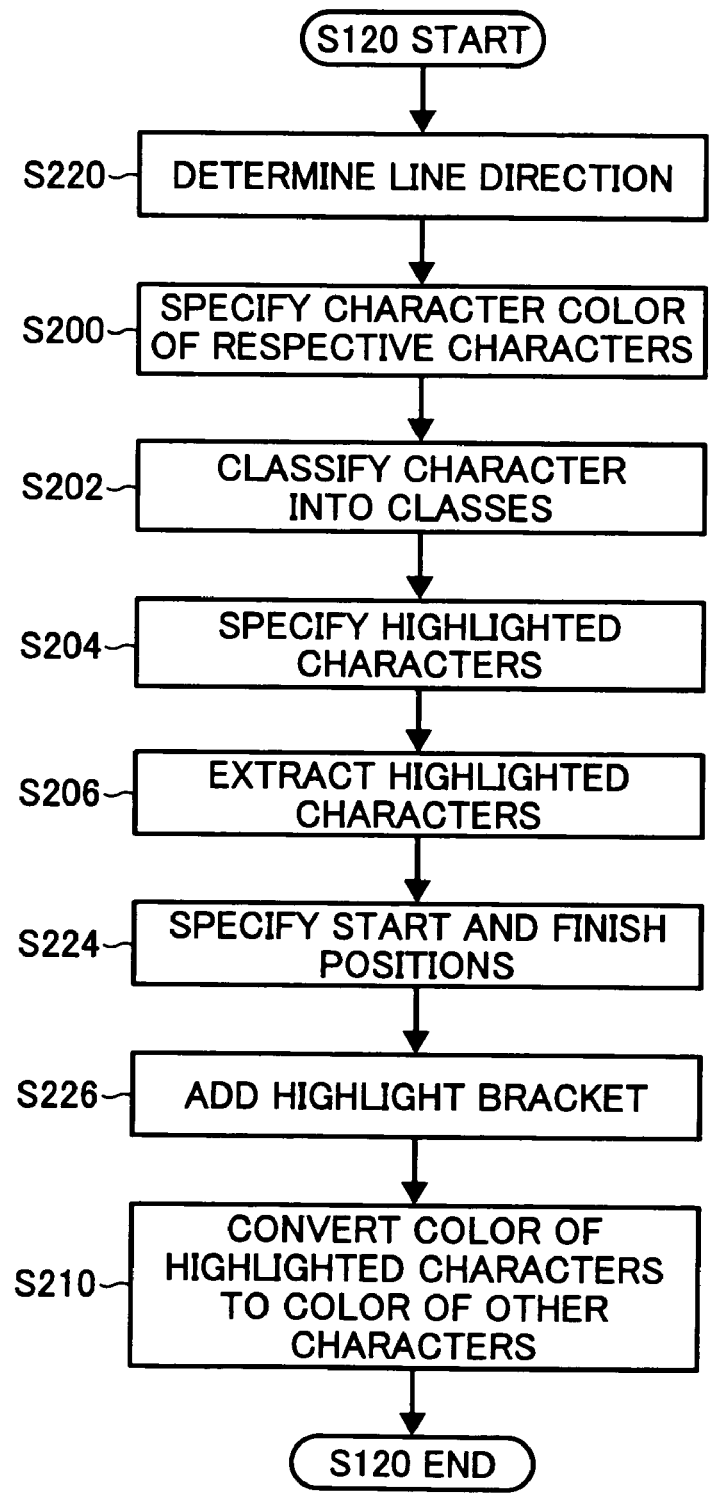
FIG. 22 is a flowchart of detailed processes in highlighted character processing by the image processing apparatus according to the fourth embodiment.

FIG. 22 is a flowchart of detailed processes in the highlighted character processing by the image processing apparatus 21 (step S120) according to the fourth embodiment. After extracting the highlighted characters (step S206), the start-and-finish position specifying unit 126 specifies the start and finish positions of the highlighted characters (step S224). The highlight processor 122 then adds a pair of brackets as the highlight mark to the start position and the finish position (step S226). Control then proceeds to step S210.

Figure 23:
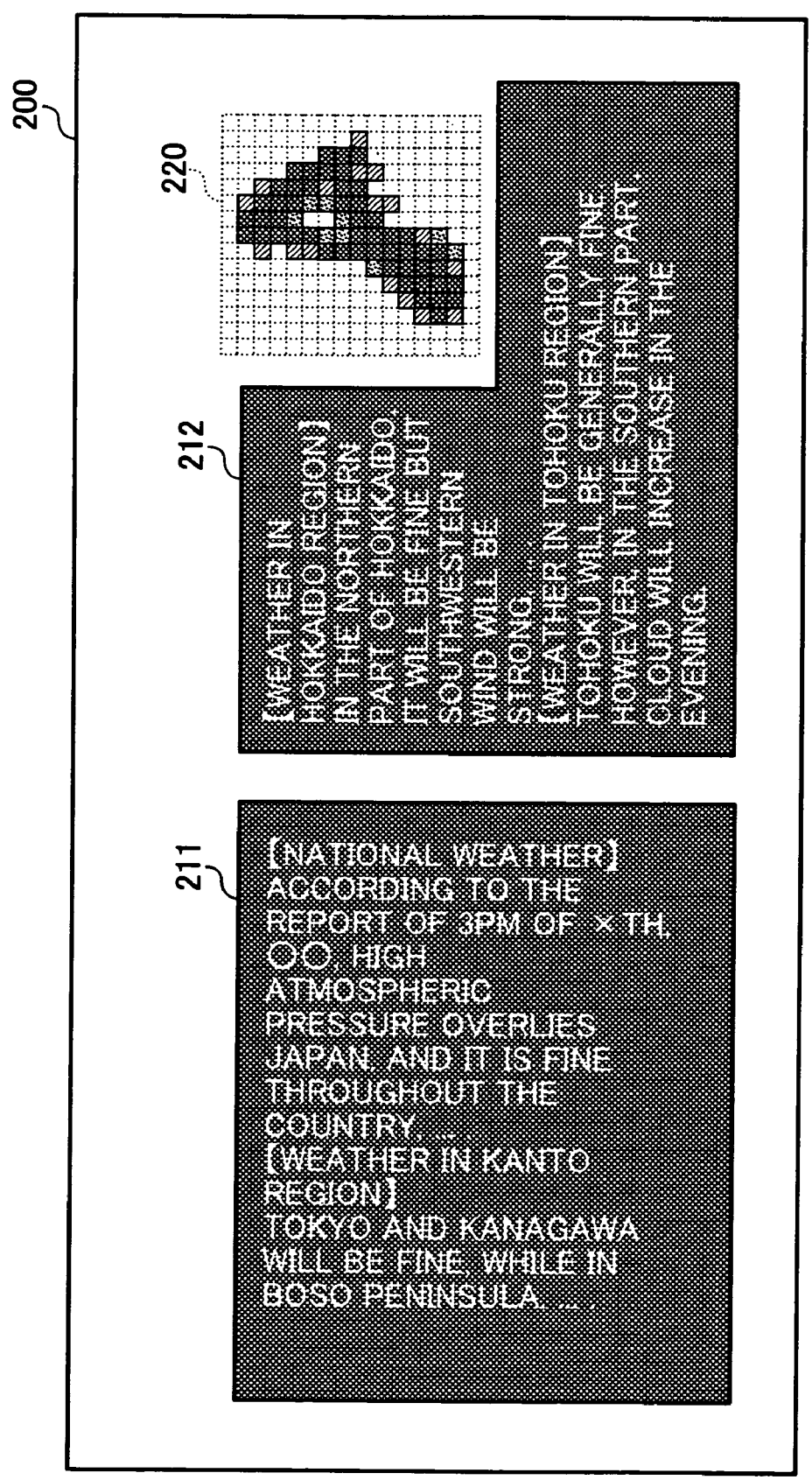
FIG. 23 is an example in which highlight brackets are added as a highlight mark at a start position and a finish position of highlighted characters.

FIG. 23 is an example in which highlight brackets are added as the highlight mark at the start position and the finish position of the highlighted characters. In this manner, the highlight marks are added at the start position and the finish position, in either case of vertical writing and horizontal writing.

Since the highlight brackets are added, the reader can visually check the start position and the finish position of the highlighted characters.

Other configuration and processing of the image processing apparatus 21 according to the fourth embodiment are the same as those of the image processing apparatus 17 according to the third embodiment.

Figures 24, 25:
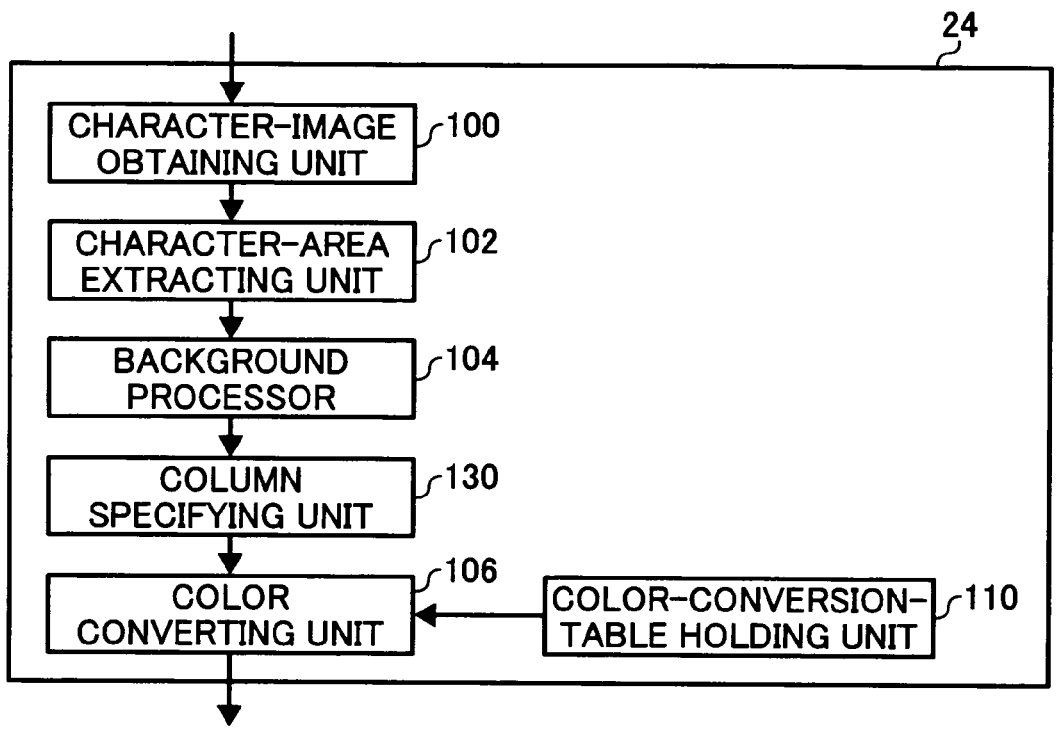
FIG. 24 is a block diagram of a functional configuration of an image processing apparatus according to a fifth embodiment of the present invention.
FIG. 25 is a schematic diagram of a data structure of the color conversion holding unit.

FIG. 24 is a block diagram of a functional configuration of an image processing apparatus 24 according to a fifth embodiment of the present invention. The image processing apparatus 24 includes a column specifying unit 130 in addition to the functional configuration of the image processing apparatus 10 according to the first embodiment. When a plurality of columns is included in the character area extracted by the character-area extracting unit 102, the column specifying unit 130 divides characters into a unit of column, to obtain a plurality of column areas. The color converting unit 106 performs color conversion with respect to the respective column areas obtained by the column specifying unit 130 using the color conversion table held by the color-conversion-table holding unit 110.

FIG. 25 is a schematic diagram of a data structure of the color-conversion-table holding unit 110. As shown in FIG. 25, the color-conversion-table holding unit 110 holds a plurality of combinations of the character color and the background color after conversion. The color-conversion-table holding unit 110 according to the fifth embodiment corresponds to a prescribed character color holding unit, a prescribed background color holding unit, and a prescribed color holding unit in the appended claims. The color converting unit 106 applies a combination different from each other, held by the color-conversion-table holding unit 110, to the respective column areas. That is, when the color converting unit 106 applies a combination "001" to a certain column area, to convert the character color to white and the background color to black, the color converting unit 106 applies a combination other than "001" to other column areas.

Since the arrangement of color in respective column areas is made different, the column area becomes clear, thereby improving clearness of a document image.

Figure 26:
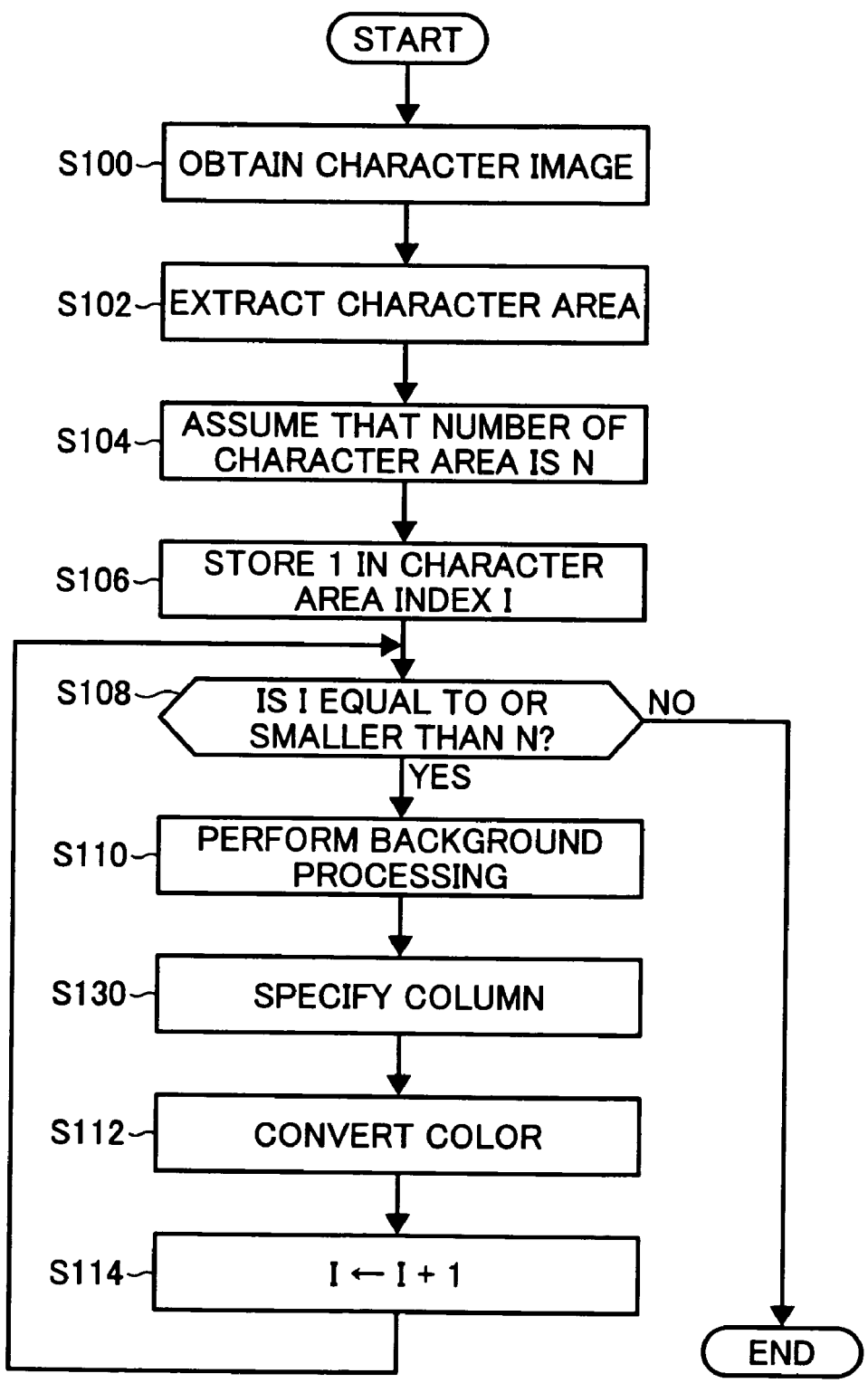
FIG. 26 is a flowchart of image processing performed by the image processing apparatus according to the fifth embodiment.

FIG. 26 is a flowchart of the image processing performed by the image processing apparatus 24 according to the fifth embodiment. After the background processing (step S110) is performed, the column specifying unit 130 specifies a column area in the character area specified by the character-area extracting unit 102 (step S130). The color converting unit 106 then performs color conversion for each column area (step S112).

Figure 27:
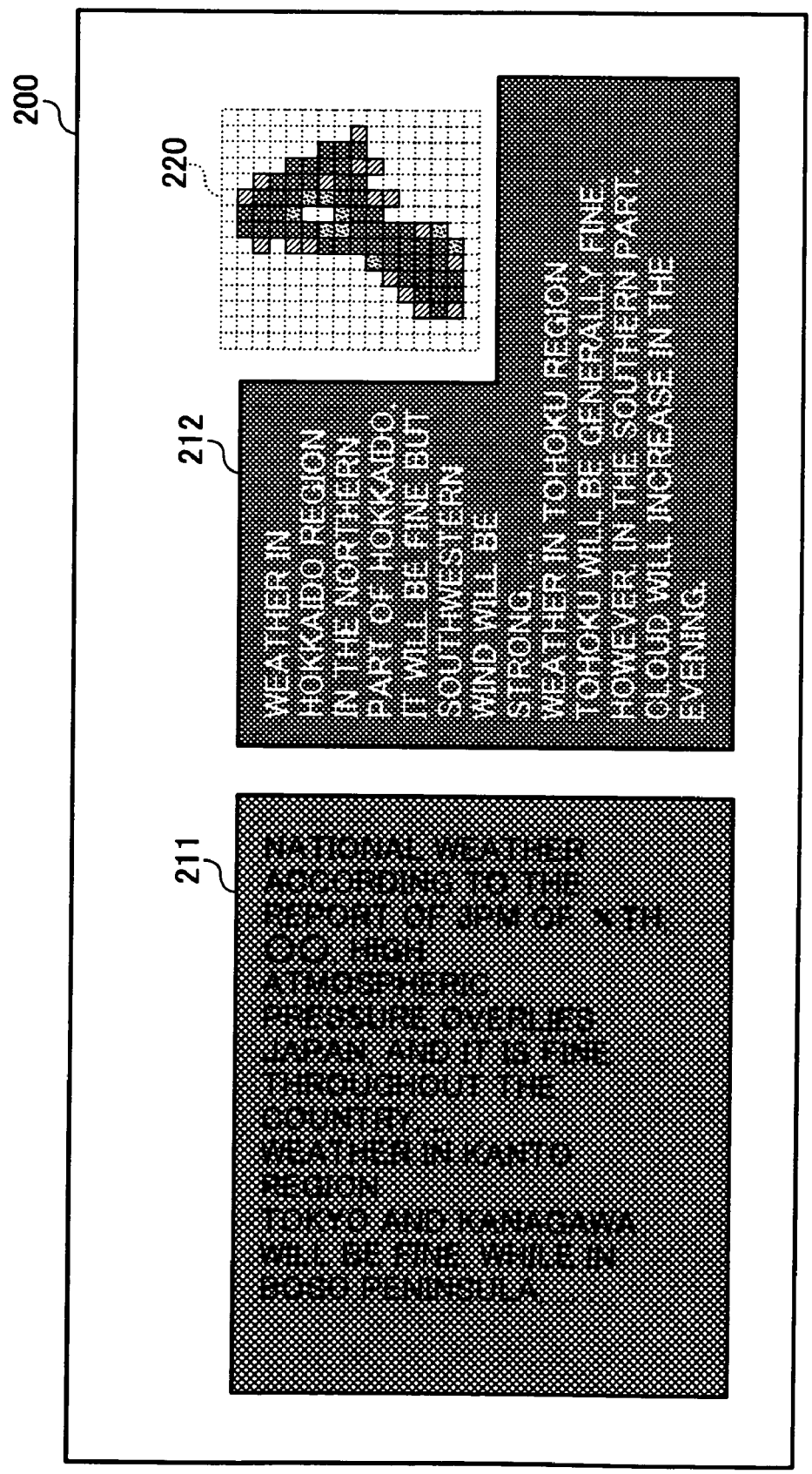
FIG. 27 depicts the character image in which the color of each column area has been converted.

FIG. 27 depicts the character image 200 in which the color of each column area has been converted. As shown in FIG. 27, the character areas 211 and 212, which are different column areas, have been converted to different coloration from each other.

Other configuration and processing of the image processing apparatus 24 according to the fifth embodiment are the same as those of the image processing apparatus 10 according to the first embodiment.

As a first example of a modification of the fifth embodiment, the coloration of the respective column areas is automatically converted to different coloration in the fifth embodiment. However, the coloration of the respective column areas can be converted to coloration specified by the user. Specifically, when the user selects a desired combination from the combinations expressed in the color conversion table shown in FIG. 25, the color converting unit 106 converts the color to the selected combination. That is, the color converting unit according to the first example modification corresponds to a prescribed character color designation receiving unit and a prescribed background color designation receiving unit in the appended claims.

According to an embodiment of the present invention, the character-area extracting unit extracts a character area in which characters are displayed from image data that includes characters, the character-color converting unit converts a character color of characters in the character area extracted by the character-area extracting unit to a predetermined prescribed character color, and the background-color converting unit converts a background color of the background, which is an area other than the characters in the character area extracted by the character-area extracting unit to a predetermined prescribed background color. Accordingly, the coloration of the document can be converted to a clearer one.

According to another embodiment of the present invention, the character color specifying unit specifies a character color of respective characters included in the character area extracted by the character-area extracting unit, and the highlighted-character extracting unit extracts characters displayed in a highlight from a plurality of characters included in the character area, based on the character color specified by the character color specifying unit. The highlight processor changes a display mode of the highlighted characters extracted by the highlighted-character extracting unit, and the character-color converting unit converts the highlighted characters and characters other than the highlighted characters, respectively, to the same prescribed character colors. Accordingly, the highlighted characters included in the document can be easily distinguished.

According to still another embodiment of the present invention, since the highlight processor changes the font of the highlighted characters, the highlighted characters included in the document can be easily distinguished.

According to still another embodiment of the present invention, since the highlight processor displays the area of the highlighted characters by shading, the highlighted characters included in the document can be easily distinguished.

According to still another embodiment of the present invention, the line-direction determining unit determines the line direction of characters in the character area extracted by the character-area extracting unit, and the highlight processor adds a mark indicating that these are the highlighted characters, when the mark is added to a position determined based on the line direction determined by the line-direction determining unit. Accordingly, the highlighted characters included in the document can be easily distinguished.

According to still another embodiment of the present invention, when the line-direction determining unit determines that the line direction is horizontal, the highlight processor adds a mark above or below the characters, and hence the highlighted characters included in the document can be easily distinguished.

According to still another embodiment of the present invention, when the line-direction determining unit determines that the line direction is vertical, the highlight processor adds a mark on the right or left of the characters, and hence the highlighted characters included in the document can be easily distinguished.

According to still another embodiment of the present invention, since the highlight processor adds a highlight line as a mark, which indicates that these are the highlighted characters, to a position determined based on the line direction determined by the line-direction determining unit. Accordingly, the highlighted characters included in the document can be easily distinguished.

According to still another embodiment of the present invention, since the highlight processor adds dots as a mark, which indicates that these are the highlighted characters, to a position determined based on the line direction determined by the line-direction determining unit, the highlighted characters included in the document can be easily distinguished.

According to still another embodiment of the present invention, a highlight start-and-finish position specifying unit specifies the start and finish positions of the highlighted characters in the line direction determined by the line-direction determining unit, and the highlight processor adds a start mark indicating that it is the start position of the highlighted characters and a finish mark indicating that it is the finish position of the highlighted characters with respect to the highlighted character start position and the highlighted character finish position specified by the highlight start-and-finish position specifying unit. Accordingly, the highlighted characters included in the document can be easily distinguished.

According to still another embodiment of the present invention, since the highlight processor adds brackets as the start mark and the finish mark, the highlighted characters included in the document can be easily distinguished.

According to still another embodiment of the present invention, an area dividing unit divides the character area extracted by the character-area extracting unit in a unit of column area in which one column is described, and the background-color converting unit converts the background color to a prescribed background color different for each column area obtained by the area dividing unit. Accordingly, the column area can be easily distinguished.

According to still another embodiment of the present invention, since the prescribed background color holding unit holds a plurality of prescribed background colors, and the background-color converting unit converts the background of each column area to a prescribed background color held by the prescribed background color holding unit, the column area can be easily distinguished.

According to still another embodiment of the present invention, the prescribed background color designation receiving unit receives a the predetermined column area obtained by the area dividing unit and designation of the prescribed background color with respect to the column area, and the background-color converting unit converts the background color of the column area to the prescribed background color, when the designation is received by the prescribed background color designation receiving unit. Accordingly, the color can be converted to a color desired by the user, and the column area can be easily distinguished.

According to still another embodiment of the present invention, the area dividing unit divides the character area extracted by the character-area extracting unit in a unit of column area in which one column is described, and the character-color converting unit converts the character color to a prescribed character color different for each column area obtained by the area dividing unit. Accordingly, the column area can be easily distinguished.

According to still another embodiment of the present invention, since the prescribed character color holding unit holds a plurality of prescribed character colors, and the character-color converting unit converts the characters in each column area to a prescribed character color held by the prescribed character color holding unit, the column area can be easily distinguished.

According to still another embodiment of the present invention, the prescribed character color designation receiving unit receives designation of the prescribed character color with respect to the characters in the predetermined column area obtained by the area dividing unit, and the character-color converting unit converts the character color of the column area to the prescribed character color, of which designation is received by the prescribed character color designation receiving unit. Accordingly, the color can be converted to a color desired by the user, and the column area can be easily distinguished.

According to still another embodiment of the present invention, the area dividing unit divides the character area extracted by the character-area extracting unit in a unit of column area in which one column is described, and the prescribed color holding unit holds prescribed character colors and prescribed background colors in association with each other. The character-color converting unit converts the character color of each column area obtained by the area dividing unit to a different prescribed character color held by the prescribed color holding unit, and the background-color converting unit converts the background color of the column area obtained by the area dividing unit to a prescribed background color associated with the prescribed character color of the column area. Accordingly, the column area can be easily distinguished.

According to still another embodiment of the present invention, the converted color holding unit holds a predetermined color and a converted color with respect to the predetermined color in association with each other, and the character-color converting unit specifies the converted color associated with the character color in the converted color holding unit as a prescribed character color, to convert the character color to the specified prescribed character color. Accordingly, the document can be converted to a clearer color.

According to still another embodiment of the present invention, the converted color holding unit holds a predetermined color and a converted color with respect to the predetermined color in association with each other, and the background-color converting unit specifies the converted color associated with the background color in the converted color holding unit as a prescribed background color, to convert the background color to the specified prescribed background color. Accordingly, the document can be converted to a clearer color.

According to still another embodiment of the present invention, the background processor applies background processing to the background in the character area extracted by the character-area extracting unit, and the background-color converting unit converts the background area having been subjected to the background processing performed by the background processor to the prescribed background color. Accordingly, the document can be converted to a clearer color.

According to still another embodiment of the present invention, the high resolution processor applies high resolution processing to characters in the character area extracted by the character-area extracting unit, and the character-color converting unit converts characters having been subjected to the high resolution processing performed by the high resolution processor to the prescribed character color. Accordingly, the document can be converted to a clearer color.

According to still another embodiment of the present invention, a character area in which characters are displayed is extracted from image data including characters at a character area extraction step, a character color of characters in the character area extracted at the character area extraction step is converted to a predetermined prescribed character color at a character color conversion step, and a background color of the background, which is an area other than the characters in the character area extracted at the character area extraction step, is converted to a predetermined prescribed background color at a background color conversion step. Accordingly, the coloration of the document can be converted to clearer one.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a character-area extracting unit to extract a character area from an image;
   a character-area specifying unit to specify a character color of a character included in the extracted character area;

a highlighted-character extracting unit to extract a highlighted character from the character included in the extracted character area based on the specified character color;

a highlight processor to change a display mode of the extracted highlighted character;

an area dividing unit to divide the extracted character area into a plurality of column areas;

a color holding unit to hold a plurality of first colors and a plurality of second colors in association with each other;

a character-color converting unit to convert the specified character color of the extracted highlighted character of a colunm area in the plurality of column areas to a first color of the plurality of first colors obtained from the color holding unit; and a background-color converting unit to convert a background color of a background of the column area of the image to a second color of the plurality of second colors, wherein the second color is identified by the color holding unit as associated with the first color.

2. The image processing apparatus according to claim 1, wherein the highlight processor changes a font of the highlighted character.

3. The image processing apparatus according to claim 1, further comprising a line-direction determining unit to determine a direction of a character line included in the extracted character area, wherein when the line-direction determining unit determines that the line direction is same as a direction in which the extracted character is aligned in the character area, the highlight processor adds a mark in the image any one of above and below the extracted character.

4. The image processing apparatus according to claim 1, further comprising a line-direction determining unit to determine a direction of a character line included in the extracted character area, wherein when the line-direction determining unit determines that the line direction is orthogonal to a direction in which the extracted character is aligned in the character area, the highlight processor adds a mark in the image any one of right and left of the extracted character.

5. The image processing apparatus according to claim 1, further comprising a line-direction determining unit to determine a direction of a character line included in the extracted character area, wherein the highlight processor adds a highlight line as a mark indicating that these are the highlighted characters to a position determined based on the line direction determined by the line-direction determining unit.

6. The image processing apparatus according to claim 1, further comprising a line-direction determining unit to determine a direction of a character line included in the extracted character area, wherein the highlight processor adds dots as a mark indicating that these are the highlighted characters to a position determined based on the line direction determined by the line-direction determining unit.

7. The image processing apparatus according to claim 1, further comprising:

a line-direction determining unit to determine a direction of a character line included in the extracted character area; and a highlight start-and-finish position specifying unit to specify a start position and a finish position of the highlighted character in the line direction determined by the line-direction determining unit, wherein the highlight processor adds a start mark at the start position and a finish mark at the finish position of the highlighted character.

8. The image processing apparatus according to claim 7, wherein the highlight processor adds a bracket as the start mark and the finish mark.

9. The image processing apparatus according to claim 1, wherein the background-color converting unit converts a background color of each of the column area to each of a plurality of different second colors.

10. The image processing apparatus according to claim 9, further comprising a color designation receiving unit to receive input of a second color for each of a column area, wherein the background-color converting unit converts the background color of a column area to a second color of which designation is received by the color designation receiving unit.

11. The image processing apparatus according to claim 1, wherein the character-color converting unit converts a character color of each column area to each of a plurality of different first colors.

12. The image processing apparatus according to claim 11, wherein the character-color converting unit converts the color of the characters in each column area to the first color held by the color holding unit.

13. The image processing apparatus according to claim 12, further comprising a color designation receiving unit to receive input of a first color for each colunm area, wherein the character-color converting unit converts the color of the characters in the column area to a first color of which designation is received by the color designation receiving unit.

14. The image processing apparatus according to claim 1, further comprising a converted color holding unit to hold a first color and a third color with respect to the first color in association with each other, wherein the character-color converting unit converts the color of the extracted highlighted character to the third color.

15. The image processing apparatus according to claim 1, further comprising a converted color holding unit to hold a first color and a third color with respect to the first color in association with each other, wherein the background-color converting unit converts the background color to the third color.

16. The image processing apparatus according to claim 1, further comprising a background processor to apply background processing to the background, wherein the background-color converting unit converts the background color of the background area having been subjected to the background processing by the background processor to the second color.

17. The image processing apparatus according to claim 1, further comprising a high resolution processor to apply high resolution processing to the character in the extracted character area, wherein the character-color converting unit converts the color of the character having been subjected to the high resolution processing by the high resolution processor to the first color.

18. An image processing method comprising:
extracting a character area from an image;
specifying a character color of a character included in the extracted character area;

extracting a highlighted character from the character included in the extracted character area based on the specified character color;

changing a display mode of the extracted highlighted character;

dividing the extracted character area into a plurality of column areas;

associating a plurality of first colors and a plurality of second colors with each other in a storage unit;

converting the specified character color of the extracted highlighted character of a column area in the plurality of column areas to a first color of the plurality of first colors; and converting a background color of a background of the column area of the image to a second color of the plurality of second colors, wherein the second color is identified by the storage unit as associated with the first color.

19. A computer-readable recording medium that stores therein a computer program that causes a computer to perform a method comprising:

extracting a character area from an image;

specifying a character color of a character included in the extracted character area;

extracting a highlighted character from the character included in the extracted character area based on the specified character color;

changing a display mode of the extracted highlighted character;

dividing the extracted character area into a plurality of colunm areas;

associating a plurality of first colors and a plurality of second colors with each other in the computer;

converting the specified character color of the extracted highlighted character of a column area in the plurality of column areas to a first color of the plurality of first colors; and converting a background color of a background of the column area of the image to a second color of the plurality of second colors, wherein the second color is identified by the computer as associated with the first color.

* * * * *